(12) United States Patent
Stubben et al.

(10) Patent No.: US 12,274,924 B2
(45) Date of Patent: *Apr. 15, 2025

(54) SUPPORT STRUCTURES FOR GOLF CLUB HEADS AND METHODS OF MANUFACTURING IMPROVED SUPPORT STRUCTURES

(71) Applicant: Topgolf Callaway Brands Corp., Carlsbad, CA (US)

(72) Inventors: Eric Stubben, Encinitas, CA (US); William C. Watson, Menifee, CA (US); Brandon D. DeMille, Carlsbad, CA (US); David R. Handy, Encinitas, CA (US); Irina Ivanova, San Marcos, CA (US); Patrick Dawson, Poway, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/387,588

(22) Filed: Nov. 7, 2023

(65) Prior Publication Data
US 2024/0075358 A1    Mar. 7, 2024

Related U.S. Application Data

(60) Continuation of application No. 17/935,462, filed on Sep. 26, 2022, now Pat. No. 11,806,591, which is a (Continued)

(51) Int. Cl.
*A63B 53/04* (2015.01)
*B22F 10/14* (2021.01)
(Continued)

(52) U.S. Cl.
CPC ...... *A63B 53/0487* (2013.01); *A63B 53/0408* (2020.08); *B22F 10/14* (2021.01);
(Continued)

(58) Field of Classification Search
CPC ..... A63B 53/007; A63B 53/04; A63B 53/045; A63B 53/0454; A63B 53/0487
(Continued)

(56) References Cited

U.S. PATENT DOCUMENTS 1,658,581 A * 2/1928 Tobia ............... A63B 60/00
D21/733
4,010,958 A * 3/1977 Long ............... A63B 53/0487
473/341
(Continued)

FOREIGN PATENT DOCUMENTS

JP       2014526366 A  * 10/2014
KR    20230066463 A  *  5/2023
WO  WO-2022056496 A1 *  3/2022  ........ A63B 53/0408

*Primary Examiner* — Alvin A Hunter
(74) *Attorney, Agent, or Firm* — Michael A. Catania

(57) ABSTRACT

A golf club head, preferably a putter head, comprising at least one structural support member is disclosed herein. The structural support member has a smooth, organic-looking aesthetic, with a continuously changing curvature along its spline and at least one surface, and preferably connects one portion of the golf club head to another portion. Where the support member connects to other portions of the golf club head, the surfaces of the member have a curvature that changes smoothly and continuously, lacking any sharp corners. The support member may be part of a lattice structure formed via binder jetting.

11 Claims, 36 Drawing Sheets

Related U.S. Application Data division of application No. 17/327,387, filed on May 21, 2021, now Pat. No. 11,484,757, and a continuation-in-part of application No. 17/092,630, filed on Nov. 9, 2020, now Pat. No. 11,130,029, which is a continuation of application No. 16/836,682, filed on Mar. 31, 2020, now Pat. No. 10,835,789, and a continuation-in-part of application No. 29/673,358, filed on Dec. 13, 2018, now Pat. No. Des. 880,631, and a continuation-in-part of application No. 29/703,641, filed on Aug. 28, 2019, now Pat. No. Des. 914,814.

(60) Provisional application No. 63/166,028, filed on Mar. 25, 2021, provisional application No. 62/892,924, filed on Aug. 28, 2019.

(51) Int. Cl.
*B22F 10/80* (2021.01)
*B33Y 10/00* (2015.01)

(52) U.S. Cl.
CPC ............. *B22F 10/80* (2021.01); *B33Y 10/00* (2014.12); *A63B 53/0412* (2020.08)

(58) Field of Classification Search
USPC .................................................. 473/324–350
See application file for complete search history.

(56) References Cited

U.S. PATENT DOCUMENTS

| | | | | |
|---|---|---|---|---|
| 4,313,607 A * | 2/1982 | Thompson | ......... | A63B 53/0466 473/328 |
| 4,511,145 A * | 4/1985 | Schmidt | ............ | A63B 53/0466 473/346 |
| 5,290,032 A * | 3/1994 | Fenton | ................ | A63B 53/047 473/332 |
| 5,295,689 A * | 3/1994 | Lundberg | ........... | A63B 53/0466 473/346 |
| 5,447,307 A * | 9/1995 | Antonious | ........... | A63B 53/047 473/350 |
| 5,451,058 A * | 9/1995 | Price | .................. | A63B 53/0466 473/340 |
| 5,549,297 A * | 8/1996 | Mahaffey | ............... | A63B 60/54 473/290 |
| 5,839,975 A * | 11/1998 | Lundberg | ............... | A63B 60/00 473/346 |
| 6,309,311 B1 * | 10/2001 | Lu | ......................... | A63B 60/00 473/340 |
| 6,558,271 B1 * | 5/2003 | Beach | .................... | A63B 60/00 473/334 |
| 6,958,019 B2 * | 10/2005 | Rohrer | .................. | A63B 60/02 473/251 |
| 7,077,758 B2 * | 7/2006 | Rohrer | ............... | A63B 53/0487 473/340 |
| 7,371,185 B1 * | 5/2008 | Rohrer | ............... | A63B 53/0487 473/340 |
| 7,384,345 B2 * | 6/2008 | Sherman | ............ | A63B 53/0487 473/340 |
| 7,396,295 B1 * | 7/2008 | Frame | .................... | A63B 60/02 473/340 |
| 7,588,499 B2 * | 9/2009 | Tateno | ................... | A63B 60/02 473/340 |
| 7,854,665 B2 * | 12/2010 | Dewhurst | .......... | A63B 53/0466 473/340 |
| 8,070,623 B2 * | 12/2011 | Stites | ................. | A63B 53/0466 473/346 |
| 8,142,308 B2 * | 3/2012 | Gillig | .................... | A63B 53/04 473/324 |
| 8,475,292 B2 * | 7/2013 | Rahrig | ............... | A63B 53/0466 473/335 |
| 8,608,585 B2 * | 12/2013 | Stites | .................. | A63B 53/047 473/282 |
| 8,915,794 B2 * | 12/2014 | Stites | ..................... | A63B 60/02 473/291 |
| 9,393,471 B2 * | 7/2016 | Beno | ...................... | A63B 53/06 |
| 9,393,473 B2 * | 7/2016 | Knight | ................ | A63B 53/047 |
| 9,409,065 B2 * | 8/2016 | Morales | ............. | A63B 53/0466 |
| 9,452,323 B2 * | 9/2016 | Kronenberg | .......... | A63B 53/04 |
| 9,597,558 B1 * | 3/2017 | Seluga | ............... | A63B 53/0466 |
| 9,597,561 B1 * | 3/2017 | Seluga | ................... | A63B 60/52 |
| 9,821,199 B1 * | 11/2017 | Seluga | .................. | A63B 60/50 |
| 9,855,475 B2 * | 1/2018 | Motokawa | ............ | A63B 60/50 |
| 9,878,217 B2 * | 1/2018 | Morales | ............... | B23K 20/233 |
| 9,889,347 B2 * | 2/2018 | Morales | ................... | B32B 3/12 |
| 9,889,349 B1 * | 2/2018 | Seluga | ................... | A63B 60/00 |
| 9,901,794 B2 * | 2/2018 | Beno | ...................... | A63B 53/06 |
| 9,931,550 B1 * | 4/2018 | Seluga | ................... | A63B 60/52 |
| 9,987,527 B1 * | 6/2018 | Myers | ............... | A63B 53/0408 |
| 10,258,846 B1 * | 4/2019 | Nunez | ............... | A63B 53/0466 |
| 10,322,320 B2 * | 6/2019 | Morales | ............... | B23K 20/023 |
| 10,343,031 B1 * | 7/2019 | Day | ................... | A63B 53/0433 |
| 10,384,107 B2 * | 8/2019 | Knight | ................ | A63B 53/047 |
| 10,512,826 B1 * | 12/2019 | Frederickson | .......... | A63B 53/06 |
| 10,532,258 B2 * | 1/2020 | Seluga | ................... | B21K 17/00 |
| 10,617,920 B2 * | 4/2020 | Nunez | ................. | A63B 53/045 |
| 10,737,147 B2 * | 8/2020 | Morales | ................. | A63B 53/04 |
| 10,835,786 B2 * | 11/2020 | Morales | ................. | A63B 53/04 |
| 10,835,789 B1 * | 11/2020 | DeMille | ............. | A63B 53/0487 |
| 11,130,029 B2 * | 9/2021 | DeMille | ............. | A63B 53/0487 |
| 11,247,104 B2 * | 2/2022 | Morales | ............... | B23K 20/023 |
| 11,311,783 B1 * | 4/2022 | DeMille | ............. | A63B 53/045 |
| 11,331,544 B1 * | 5/2022 | DeMille | ................. | G06F 30/10 |
| 11,484,755 B2 * | 11/2022 | Morales | ............. | A63B 53/0466 |
| 11,484,757 B1 * | 11/2022 | DeMille | ............. | A63B 53/045 |
| 11,497,973 B1 * | 11/2022 | DeMille | ................. | A63B 60/08 |
| 11,524,213 B1 * | 12/2022 | Roach | ...................... | B22F 5/10 |
| 11,607,735 B1 * | 3/2023 | DeMille | ................. | B22F 10/14 |
| 11,628,339 B1 * | 4/2023 | DeMille | ................. | B22F 10/80 |
| 11,724,162 B2 * | 8/2023 | Morales | ............... | B23K 20/021 473/331 |
| 11,857,851 B1 * | 1/2024 | DeMille | ................. | B22F 10/14 |
| 12,036,450 B1 * | 7/2024 | DeMille | ............. | A63B 53/0437 |
| 12,090,376 B1 * | 9/2024 | DeMille | ............. | A63B 53/045 |
| 2003/0228925 A1 * | 12/2003 | Rohrer | ................... | A63B 60/02 473/340 |
| 2005/0239574 A1 * | 10/2005 | Rohrer | ................... | A63B 60/02 473/340 |
| 2008/0200282 A1 * | 8/2008 | Frame | ................. | A63B 53/0487 473/340 |
| 2014/0274459 A1 * | 9/2014 | Kronenberg | ........... | A63B 53/04 473/345 |
| 2016/0263449 A1 * | 9/2016 | Morales | ............. | A63B 53/0416 |
| 2016/0317881 A1 * | 11/2016 | Morales | ............... | B23K 20/023 |
| 2018/0117424 A1 * | 5/2018 | Morales | ............. | A63B 53/0466 |
| 2018/0117426 A1 * | 5/2018 | Morales | ................. | B23K 20/02 |
| 2019/0262668 A1 * | 8/2019 | Morales | ............. | A63B 53/0416 |
| 2019/0275387 A1 * | 9/2019 | Morales | ............... | B23K 20/233 |
| 2020/0368588 A1 * | 11/2020 | Morales | ................. | A63B 53/04 |
| 2021/0069556 A1 * | 3/2021 | Morales | ............... | B23K 20/023 |
| 2021/0077865 A1 * | 3/2021 | Morales | ................... | A63B 60/02 |
| 2022/0080270 A1 * | 3/2022 | Brubaker | ........... | A63B 53/0408 |
| 2022/0161105 A1 * | 5/2022 | Morales | ............. | A63B 53/0466 |
| 2022/0305349 A1 * | 9/2022 | DeMille | .................. | B22F 5/10 |
| 2022/0401799 A1 * | 12/2022 | DeMille | ............. | A63B 53/0437 |
| 2023/0019821 A1 * | 1/2023 | DeMille | ............. | A63B 53/0408 |

* cited by examiner

SUPPORT STRUCTURES FOR GOLF CLUB HEADS AND METHODS OF MANUFACTURING IMPROVED SUPPORT STRUCTURES

CROSS REFERENCES TO RELATED APPLICATIONS

The present application is a continuation application of U.S. patent application Ser. No. 17/935,462, filed on Sep. 26, 2022, which is a divisional application of U.S. patent application Ser. No. 17/327,387, filed on May 21, 2021, now U.S. patent Ser. No. 11/484,757, issued on Nov. 1, 2022, which claims priority to U.S. Provisional Application No. 63/166,028, filed on Mar. 25, 2021, and is a continuation-in-part of U.S. patent application Ser. No. 17/092,630, filed on Nov. 9, 2020, now U.S. patent Ser. No. 11/130,029, issued on Sep. 28, 2021, which is a continuation of Ser. No. 16/836,682, filed on Mar. 31, 2020, and issued on Nov. 17, 2020, as U.S. patent Ser. No. 10/835,789, which claims priority to U.S. Provisional Patent Application No. 62/892,924, filed on Aug. 28, 2019, and is a continuation-in-part of U.S. Design patent application Ser. No. 29/673,358, filed on Dec. 13, 2018, and issued on Apr. 7, 2020, as U.S. Design Patent Number D880631, and is a continuation-in-part of U.S. Design patent application Ser. No. 29/703,641, filed on Aug. 28, 2019, now U.S. Patent Number D914814, issued on Mar. 30, 2021, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to a golf club head, particularly a putter, with improved structures supporting upper and lower portions of the head, and methods of manufacturing golf club components with such improved structures.

Description of the Related Art

Traditional CAD modeling techniques used to design golf club heads, and particularly putters, lend themselves to certain, angular styles or appearances. Organic-looking, smoothly curved features are more time consuming and difficult to create than traditional, angled connectors. As a result, support structures created with traditional modeling techniques tend to have common characteristics. Specifically, as shown in FIGS. 1-3, tangency T between neighboring surfaces is common, but these transitions do not typically have smooth curvatures, especially where two or more slender structural elements intersect. In fact, as shown in FIGS. 4-5, the surface curvature changes along the spline of the structural elements are discrete. Furthermore, these traditional connections are subject to increased strain and breakage.

Typical additive manufacturing techniques, also known as 3D printing, can be used to create the prior art structures, but have their own drawbacks. For example, direct metal laser sintering (DMLS), direct metal laser melting (DMLM), and electron beam additive manufacturing (EBAM) use controlled energy sources, including lasers and electron beams in which intense, extremely localized heat is applied to metal powder to melt and/or sinter adjacent particles together. This intense heat tends to cause warping, porosity (which creates inconsistent density throughout the part), distortion, surface defects, and even cracking of the parts during the build process, even when the laser intensity, focal length, and path speed are optimal.

Other characteristics of these techniques include using very small moving points to build parts, provide limited solutions for removing excess powder from the finished part, require significant post-processing to remove supports and support footprints on the surface, and require a very specific grade of metal powder (e.g., smaller than 40 microns, spherical particles) for high resolution and to guarantee an even sintering and a relatively smooth surface finish. These characteristics render these techniques suboptimal and cost-prohibitive for golf club manufacturing purposes.

The most significant drawback of the DMLS and DMLM techniques is the constraint they place on overhang angle, examples of which are shown in FIG. 45. As golf club parts are built, structures created by the prior art additive manufacturing techniques described above are not self-supporting, with thin beads of sintered material tending to sag and fall if they are not supported by connections to the build plate or another portion of the part that has already been fully sintered. As a result, a typical design requirement is that all surfaces be no more than 45° from the build axis, but the limit is typically 30-60°. The only alternative to the overhang angle design requirement is to add supports to the structure to help prevent sagging during the build process. The supports used for DMLS, DMLM, and EBAM are metal and are directly connected to the part, and are difficult to remove without negatively affecting the surface finish on the part or creating a large opening in the club head.

The overhang angle constraint dramatically limits the potential of otherwise promising designs that are based on modern generative design techniques like topology optimization. It also severely limits the types, orientations and sizes of cells that can be manufactured to form lattices. Even when a designer settles on a cell type that satisfies the overhang constraint, there is often no room for further optimization of the lattice via purposeful warping, skewing or otherwise stretching portions of the lattice to generate an improved design. It is also impractical to use metal supports to make fine lattice structures feasible to manufacture. If a lattice were to include overhanging beams and the beams are supported, the supports would be impossible to remove.

Therefore, there is a need for a golf club head, and particularly a putter, with improved structural support members and connectivity between those support members and other parts of the golf club head, and improved methods of manufacturing such structural support members.

BRIEF SUMMARY OF THE INVENTION

The present invention is directed to a golf club head, and particularly a putter, comprising support structures that: (1) are less susceptible to stress concentrations during the use of the structural part or component; (2) allow for improved flow and reduced porosity in investment casting operations; (3) allow for improved flow and reduced porosity in plastic injection molding, metal injection molding, and compression molding; (4) are less susceptible to local stress concentrations and cracking during sintering; and/or (5) are less susceptible to local stress concentrations and cracking during the build process for laser-based 3D printing methods, and particularly binder jetting. The support structures of the present invention have an "organic" appearance that is not found in prior art structural golf club parts.

One aspect of the present invention is a method comprising the steps of spreading layers of powdered material across a portion of a binder jet machine, depositing liquid binder on regions of each layer of powder so that the binder bonds adjacent particles of powdered material together, repeating the spreading and depositing steps until a green part is formed, and sintering the green part to create a final part, wherein the final part is a putter head body comprising at least one support member. In some embodiments, the method may further comprise the step of removing binder via a debinding process, and the removing step may occur prior to the sintering step. In a further embodiment, the removing step and the sintering step may occur in the same furnace.

In other embodiments, the method may further comprise the step of preparing design parameters for the golf club component using optimization software, and the preparing step may occur before all other steps of the method. In a further embodiment, the preparing step may comprise inputting into the optimization software at least one parameter, which may be selected from the group consisting of individual player measurements, club head delivery data, impact location, and historical player data.

In a further embodiment, the at least one support member may comprise a first end, a second end, a surface, an equivalent diameter, a spline, and a cross-sectional shape, the equivalent diameter $D_E$ of a cross section taken at any point along the spline may be calculated using the formula $D_E=(4*A/pi)^{(1/2)}$, A may be an area of a cross-section of the support member, the at least one support member may have a length that is greater than $D_{EA}$, and $D_{EA}$ may be defined as the average equivalent diameter along the length of the entire support member. In some embodiments, the equivalent diameter may always be greater than 0.010 inch and less than 1.000 inch. In a further embodiment, the spline may be curved and have a length that is at least three times the value of the average equivalent diameter $D_{EA}$. In other embodiments, the equivalent diameter may change continuously along the entire length of the spline. In still other embodiments, the cross-sectional shape may change continuously along the entire length of the spline. In any of these embodiments, the at least one support member may connect a sole portion of the putter head to a top portion of the putter head.

Yet another aspect of the present invention is a putter head comprising a body composed of a first material having a first density, the body comprising a face portion, a top portion, and a sole portion with a sole recess, a sole insert composed of a second material having a second density, and at least one weight composed of a third material having a third density, wherein the second density is less than the first density, wherein the third density is greater than the first density, wherein the sole insert comprises a lattice structure with at least one support structure, wherein the at least one support structure comprises a length, a width, a first end, a second end, a surface, a variable equivalent diameter, a spline, and a variable cross-sectional shape, and wherein the at least one weight is affixed to the sole portion. In some embodiments, the length may be greater than the average equivalent diameter, the equivalent diameter $D_E$ of a cross section taken at any point along the spline may be calculated using the formula $D_E=(4*A/pi)^{(1/2)}$, A may be an area of a cross-section of the support member, the equivalent diameter may be greater than 0.010 inch and less than 1.000 inch and may change continuously along the length of the spline, the spline may be curved and have a length that is at least three times the value of the equivalent diameter, and the cross-sectional shape may change continuously along the length of the spline.

In some embodiments, the at least one support member may extend at an angle from the sole portion, and the angle may be less than 75°. In other embodiments, the at least one support member may not comprise any sharp corners or simple fillets with constant surface structure. In still other embodiments, the at least one support member may comprise at least six support members, and each of the support members may extend at an angle with respect to the sole portion. In another embodiment, the equivalent diameter may be no less than 0.025 inch and no more than 0.500 inch at any point taken along the length of the support member. In a further embodiment, the equivalent diameter may be no less than 0.050 inch and no more than 0.250 inch at any point taken along the length of the support member. In any of the embodiments, the sole insert may be composed of a non-metal material, which may include reinforcing fibers.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
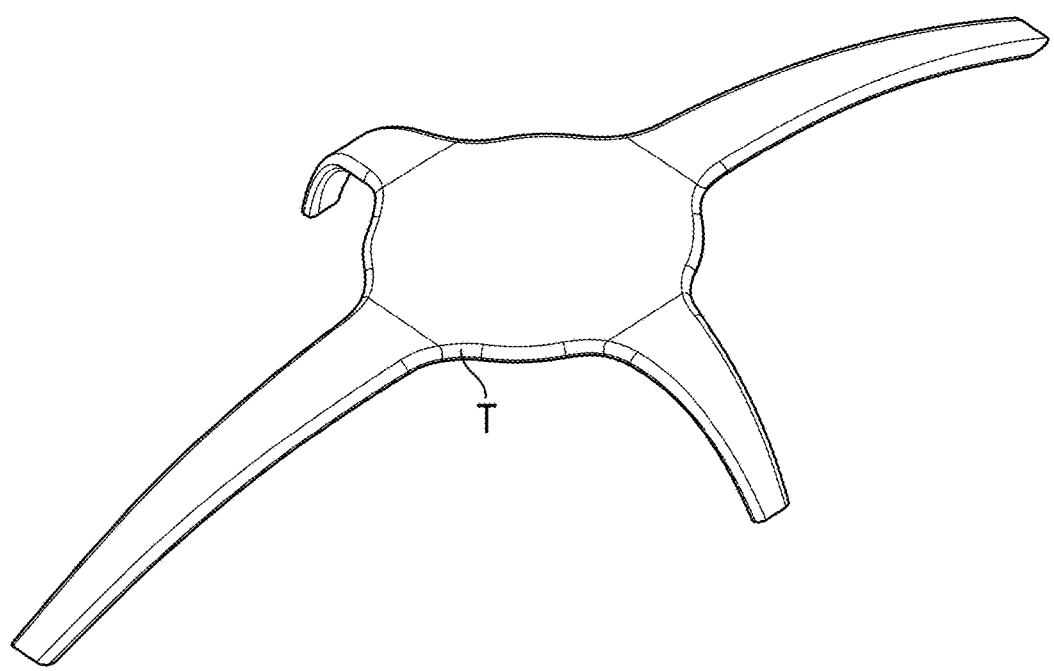
FIG. 1 is top perspective view of a first prior art support structure.
Figure 2:
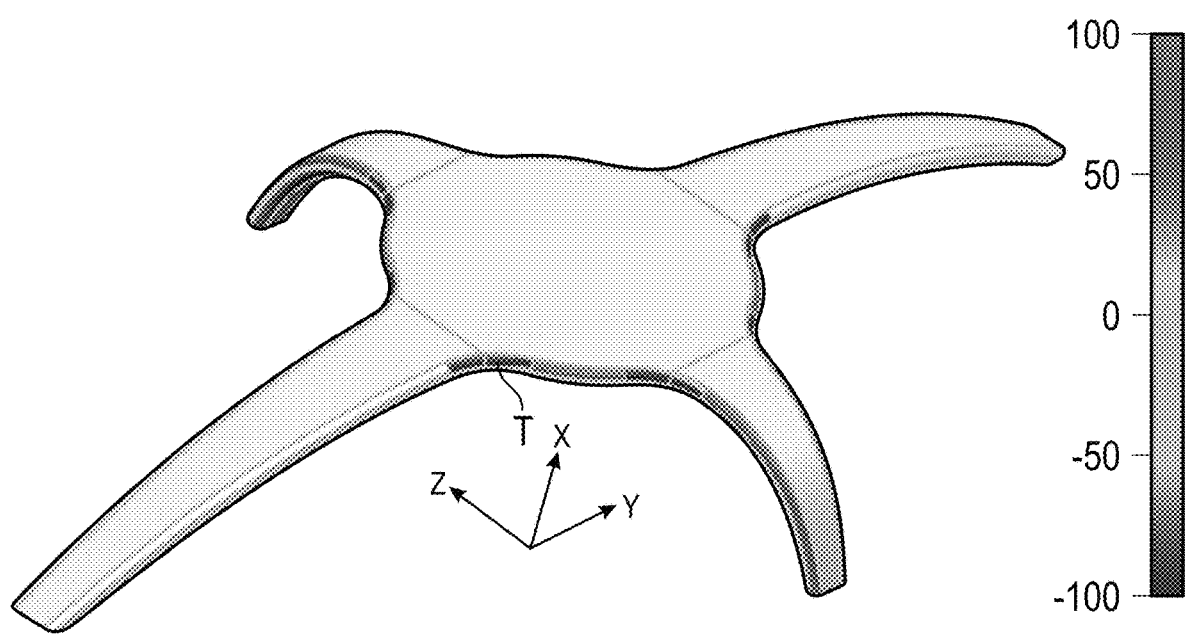
FIG. 2 is a top perspective view of a second prior art support structure.
Figure 3:
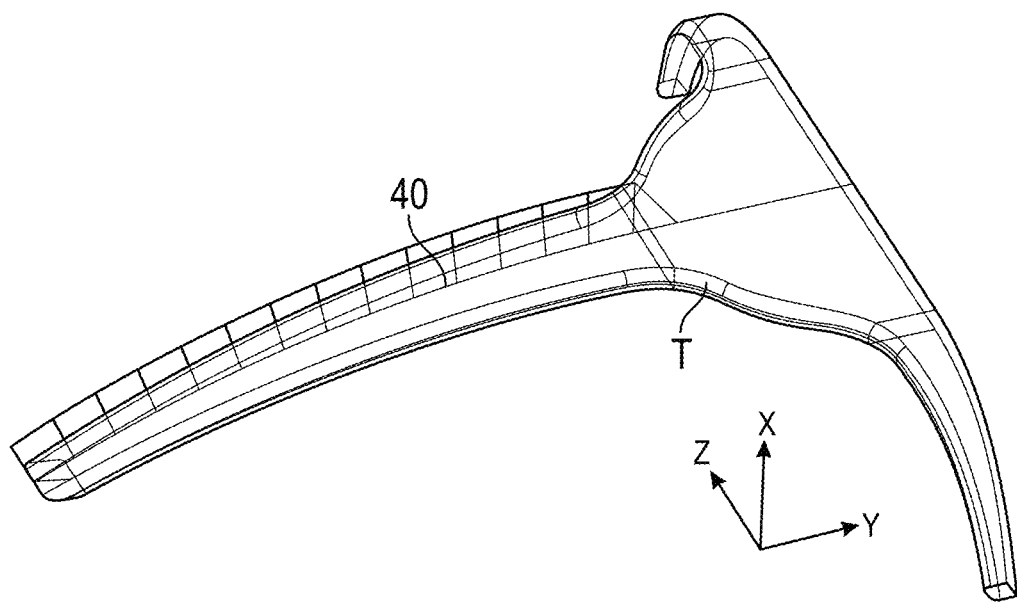
FIG. 3 is a line drawing of a third prior art support structure.
Figure 4:
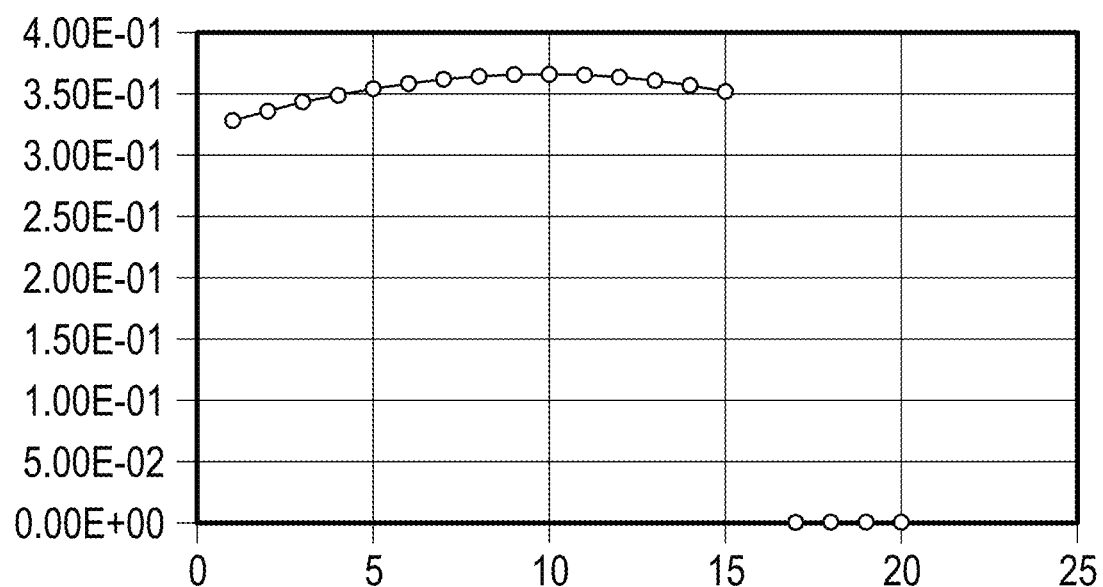
FIG. 4 is a graph showing the curvature of the spline of the embodiment shown in FIG. 3.
Figure 5:
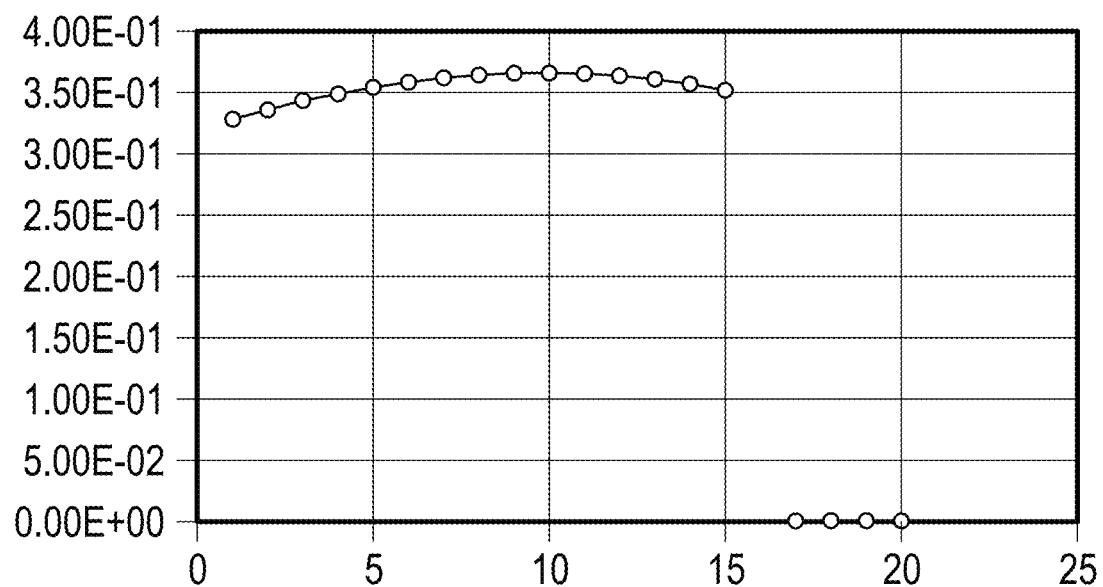
FIG. 5 is a graph showing the derivative of curvature vs. position on spline of the embodiment shown in FIG. 3.
Figure 6:
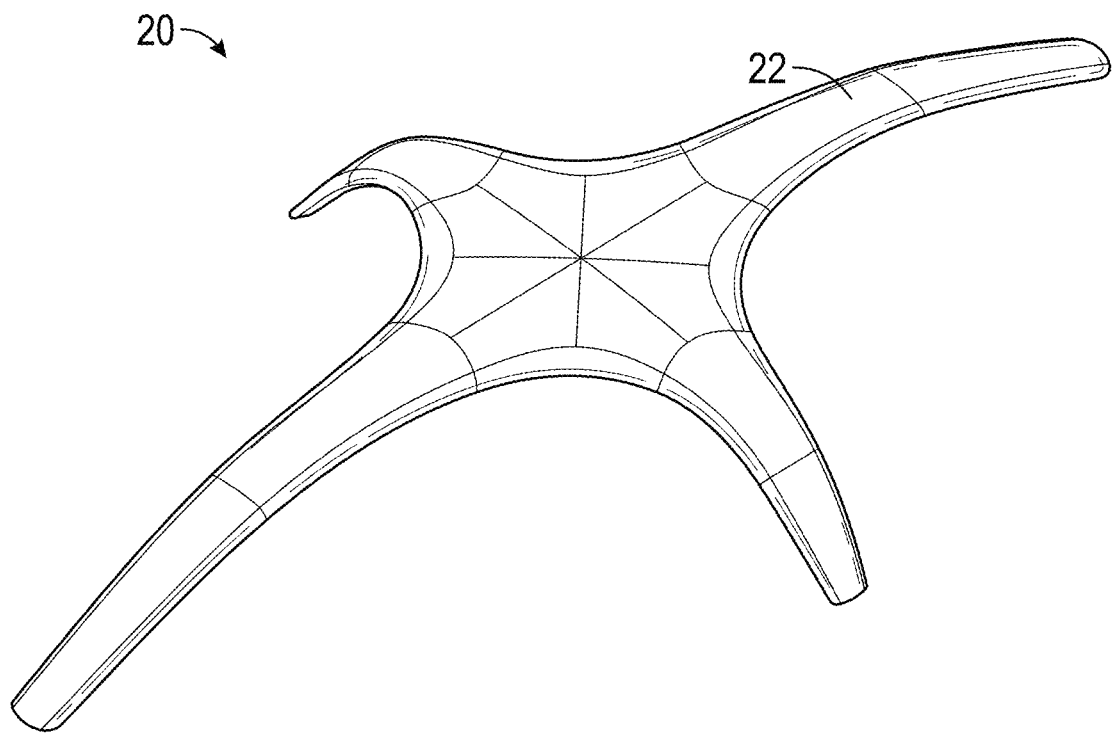
FIG. 6 is a top perspective view of a first embodiment of the support member of the present invention.
Figure 7:
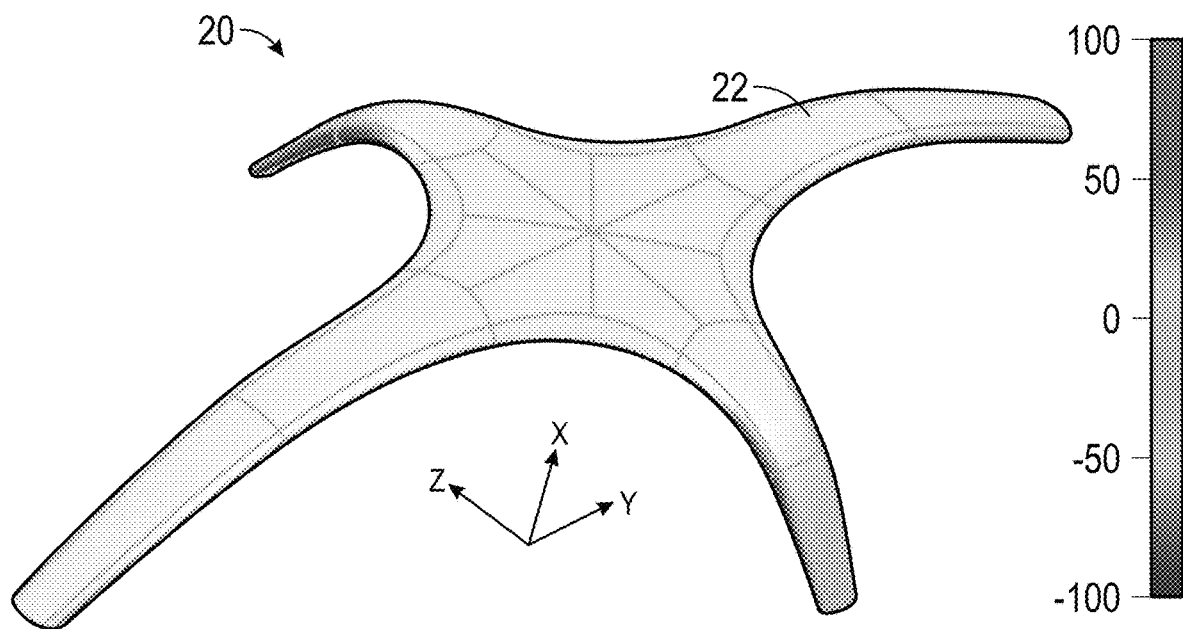
FIG. 7 is a top perspective view of a second embodiment of the support member of the present invention.
Figure 8:
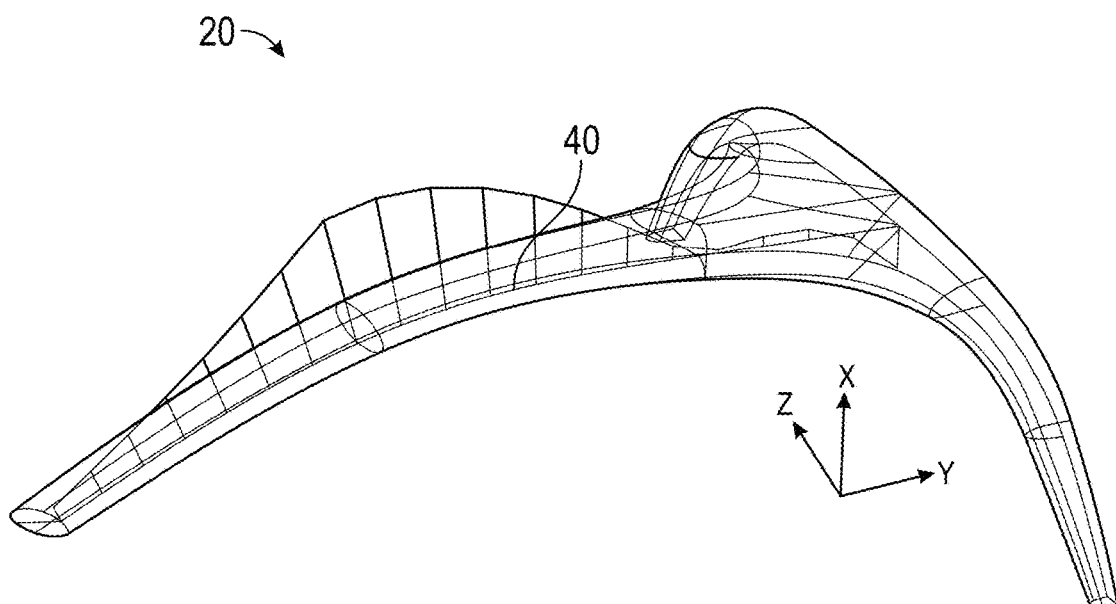
FIG. 8 line drawing of a third embodiment of the support member of the present invention.

The present invention is directed to a golf club head, and particularly a putter head 10, with improved structural support members 20. The putter head 10 comprises a face 16, a sole portion 12 extending from a lower edge 18 of the face 16, and a top or crown portion 14 extending from an upper edge 17 of the face 16. Though the embodiments herein are directed to a putter head, the novel features disclosed herein may be used in connection with other types of golf club heads, such as drivers, fairway woods, irons, and wedges.

In order to attain an optimized design for the support members 20, the relationship between curvature, rate of change of curvature, spline length, cross-sectional area, and cross-sectional shape of each structure must be examined. By controlling each of these geometric features, support members 20 can be created that are much improved over existing prior art support structures within golf club heads.

Figure 13:
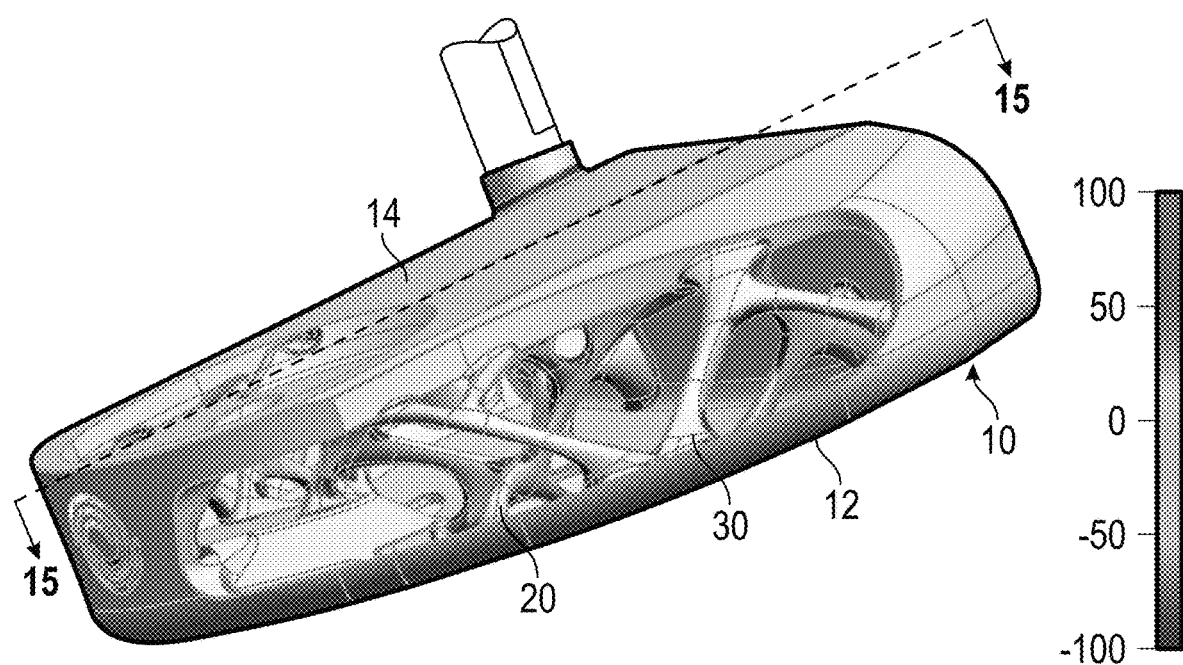
FIG. 13 is a rear perspective view of the putter head shown in FIG. 12 without the enclosed volume shading and incorporating a plurality of support members of the present invention.
Figure 14:
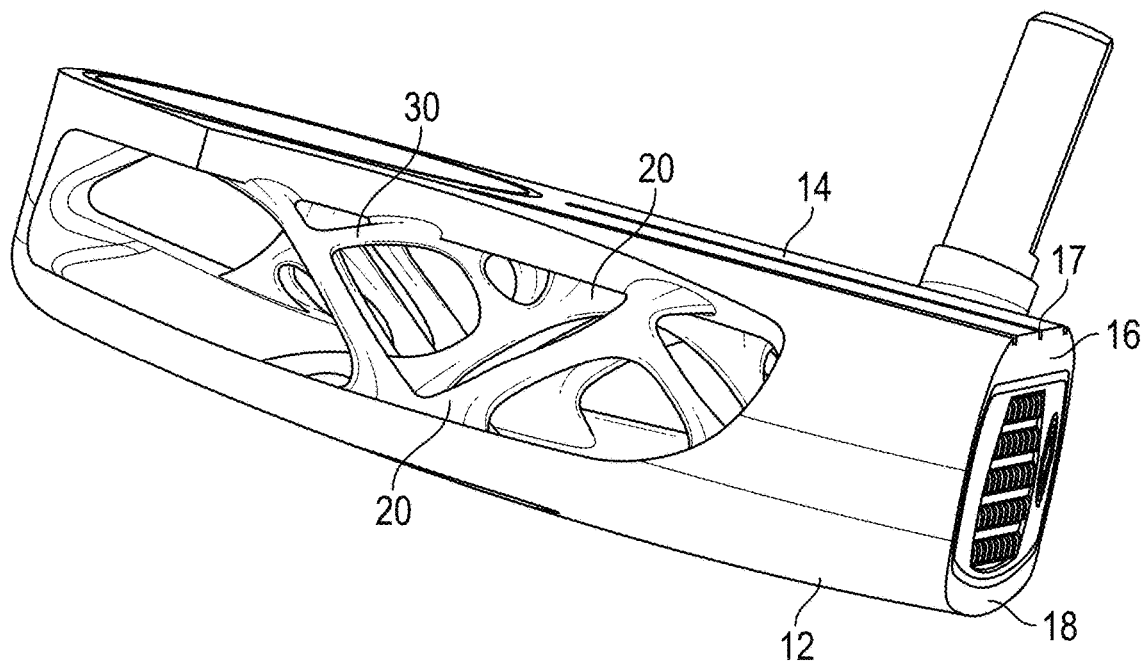
FIG. 14 is a side view of the embodiment shown in FIG. 13.
Figure 15:
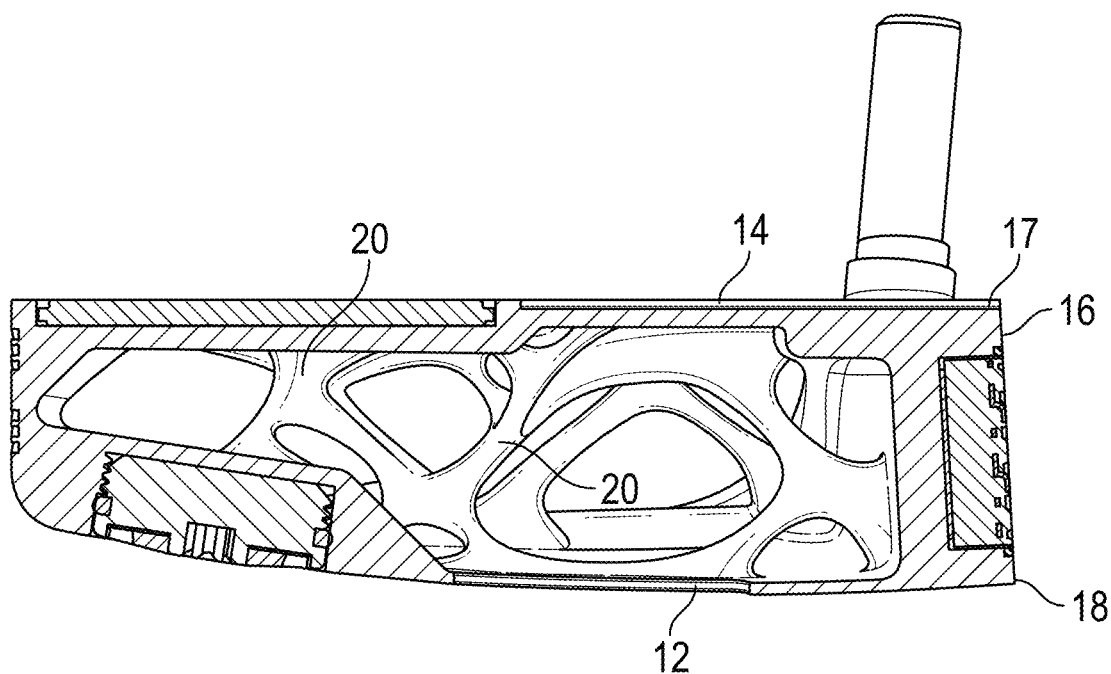
FIG. 15 is a cross-sectional view of the putter head shown in FIG. 13 along lines 15-15.

The support members 20 of the present invention include networks of slender connected elements, and may also be referred to as rods, beams, or ligaments. Each support member 20 is either connected to another support member 20 or to the surface of another type of structure, such as a sole portion 12 or top or crown portion 14 of the putter head 10. In the preferred embodiment shown in FIG. 13-15, the support members connect the sole portion 12 to the crown portion 14, but in an alternative embodiment, the support members may attach only to a single surface, such as the face 16. Some support members 20 also have at least one connection to another support member 20.

At the connection to another support member 20, the surfaces 22 of the support member 20 have a curvature that changes smoothly and continuously. There are no sharp corners and there are no simple fillets with constant surface curvature.

Figure 9:
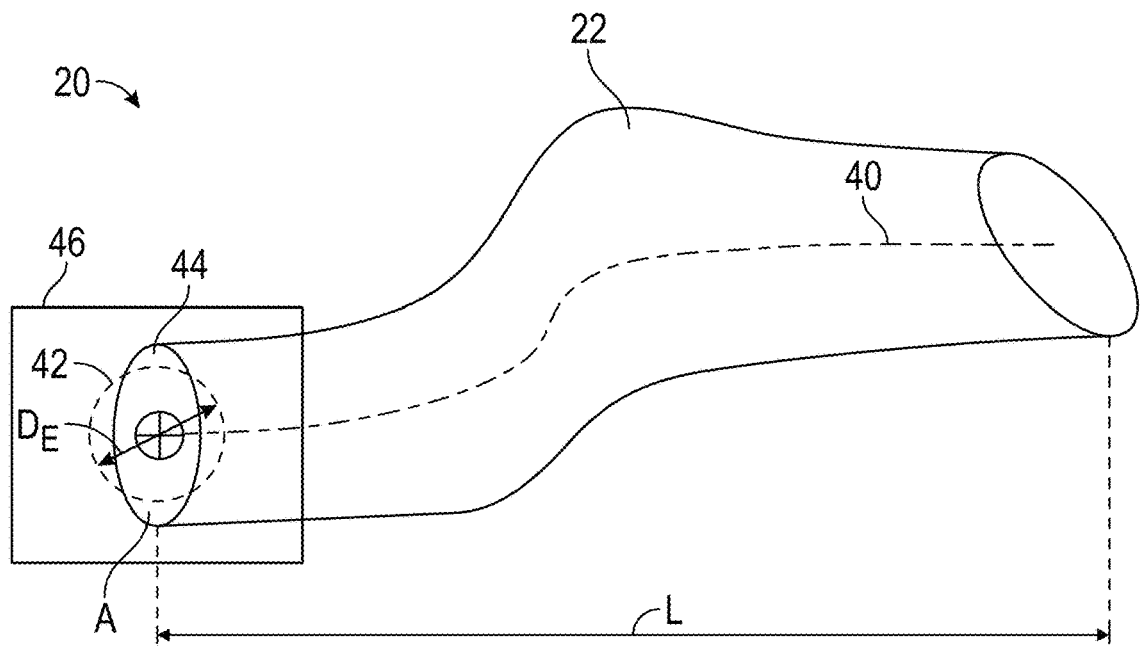
FIG. 9 is a line drawing of a fourth embodiment of the support member of the present invention.

As shown in FIG. 9, for each support member 20, the equivalent diameter $D_E$ is the diameter of a circle 42 with the same area A as the cross section 44 of the support member 20. The cross section 44 is taken in the plane 46 normal to the spline 40 running through the center of the support member 20 along its length. The support member 20 cross section 44 has an area A, and the equivalent diameter $D_E$ is defined as $D_E = (4*A/pi)^{(1/2)}$.

The length of the spline 40 is no less than three times the equivalent diameter $D_E$. The equivalent diameter $D_E$ and the cross sectional shape 44 change continuously along the length of each spline 40, but the equivalent diameter $D_E$ is always greater than 0.010" and always less than 1.000", more preferably 0.050"-0.500," and most preferably 0.050"-0.250".

Figure 10:
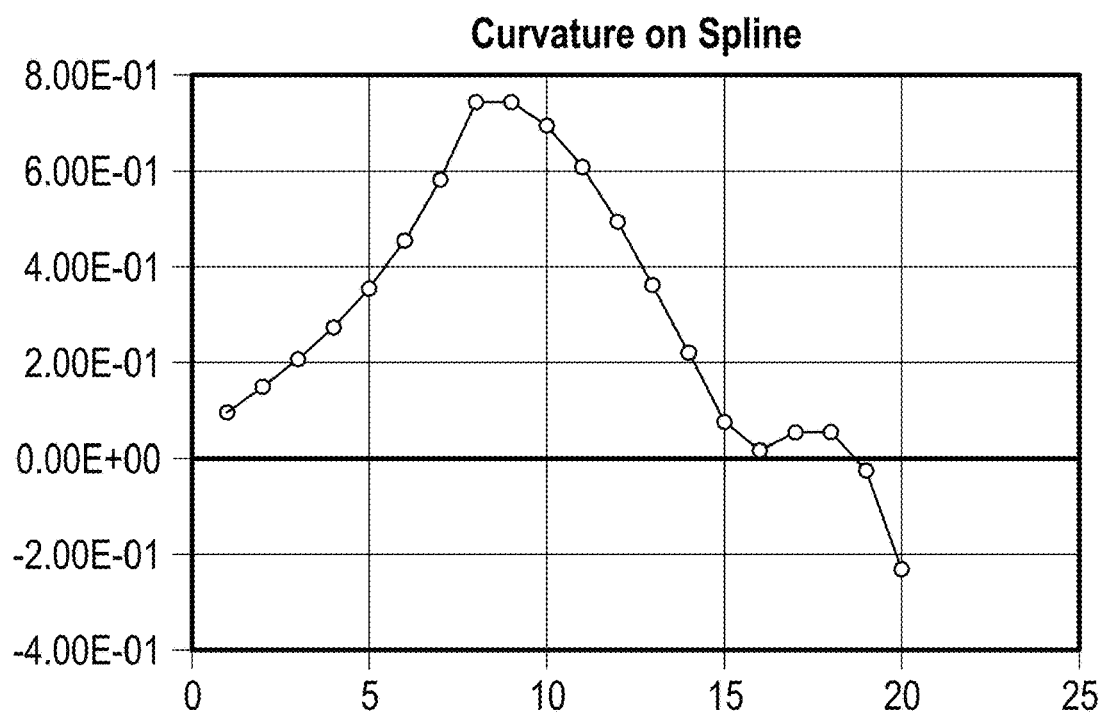
FIG. 10 is a graph showing the curvature of the spline of the embodiment shown in FIG. 8.
Figure 11:
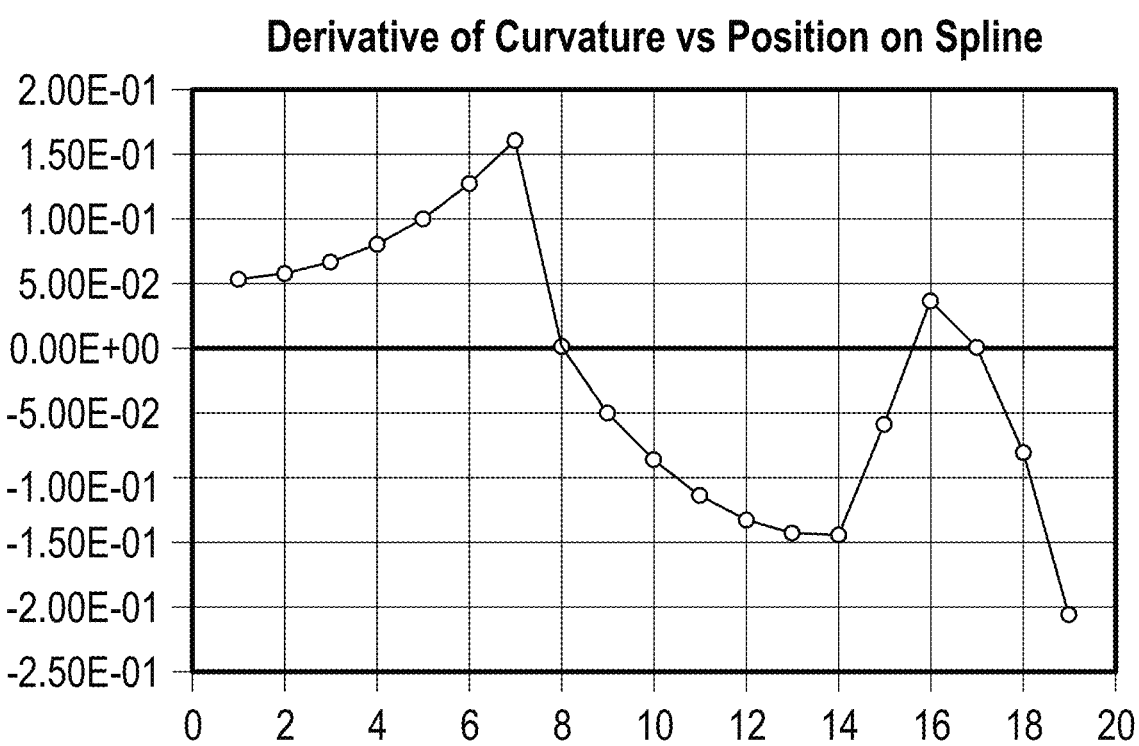
FIG. 11 is a graph showing the derivative of curvature vs. position on spline of the embodiment shown in FIG. 8.
Figure 12:
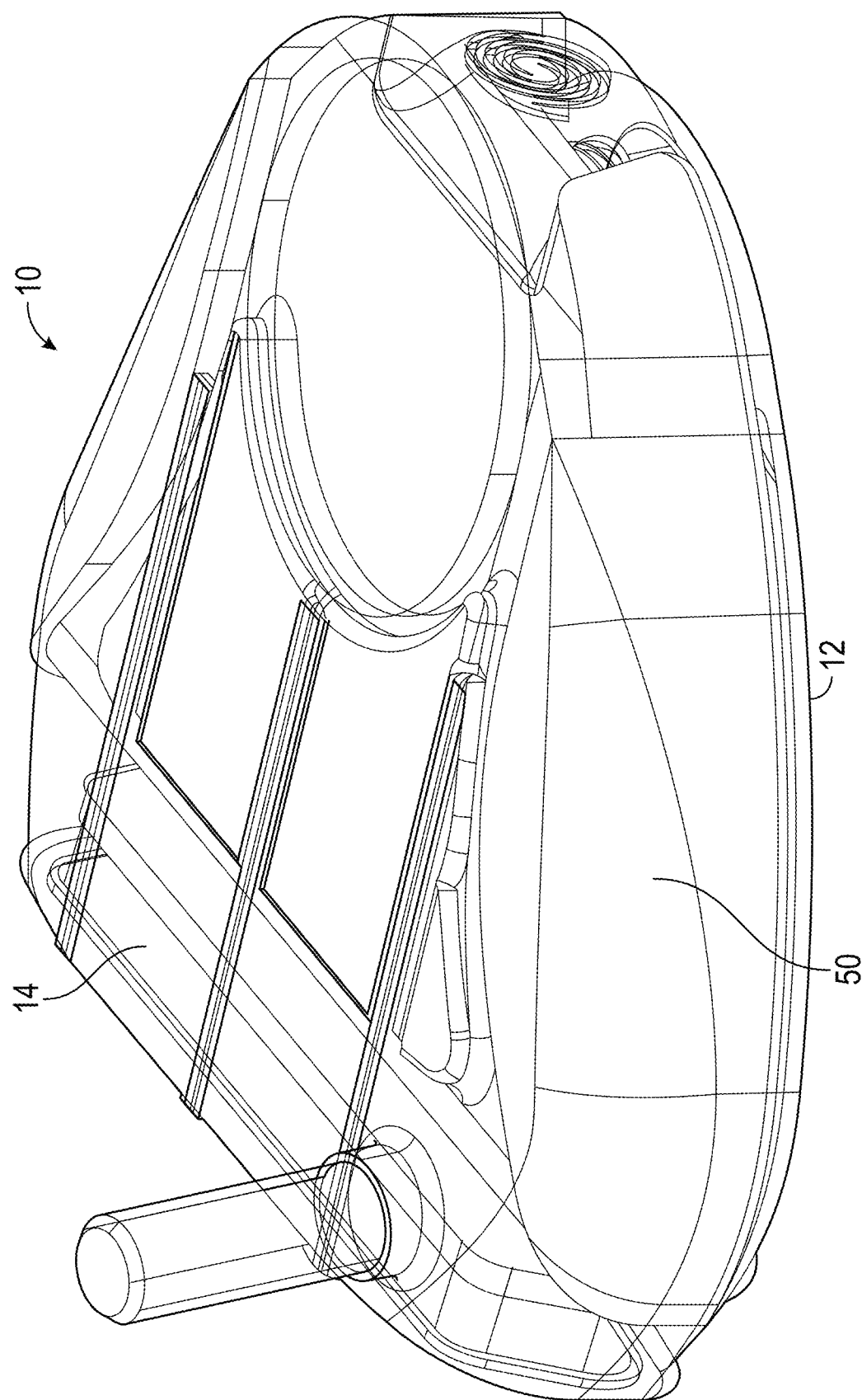
FIG. 12 is a side perspective view of a putter head with shading representing an enclosed volume.

As shown in FIGS. 6-9, each spline 40 is curved, and as illustrated in FIGS. 10-11, the curvature continuously changes along the length of the spline 40, with specific ranges of curvature and rates of change of curvature. The entire network of support members 20 occupies a volume 30 that is no greater than 75% of the enveloping volume 50. The enveloping volume 50, which is illustrated in FIG. 12, is the total volume that could be occupied by support members given the application.

When compared with prior art structural members, the support members 20 disclosed herein (1) are less susceptible to stress concentrations during the use of the structural part or component, (2) allow for improved flow and reduced porosity in investment casting operations, (3) allow for improved flow and reduced porosity in plastic injection molding, metal injection molding, compression molding, (4) are less susceptible to local stress concentrations and cracking during sintering of metal injection molding or 3D printed parts, and (5) are less susceptible to local stress concentrations and cracking during the build process for laser-based 3D printing methods, like binder jetting. The support members 20 of the present invention also have a unique "organic" appearance that is not found in prior art structural golf club parts.

Figure 16:
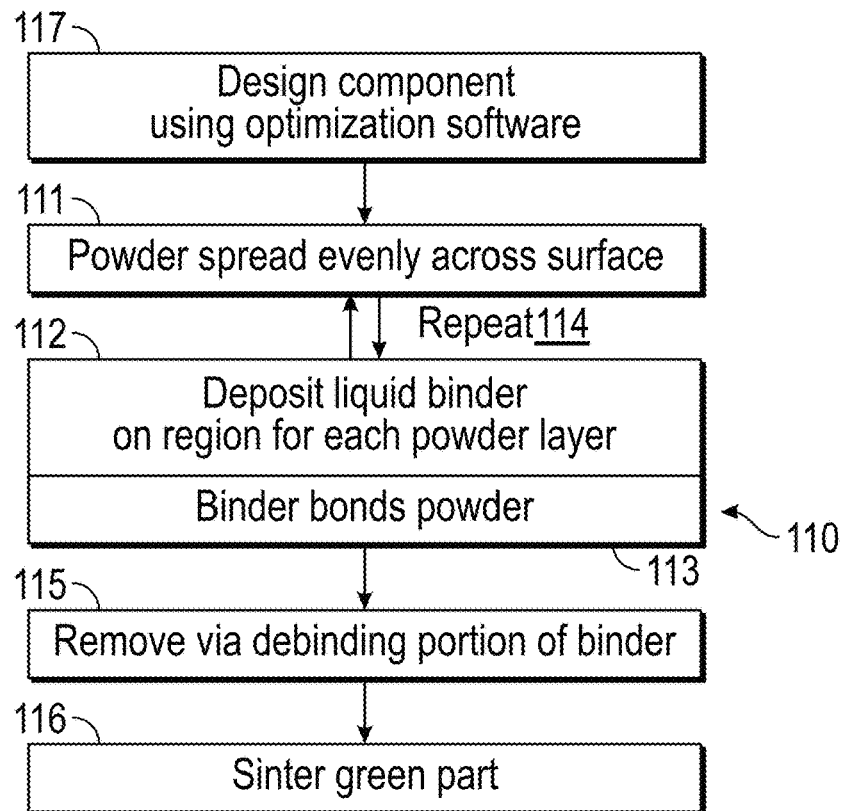
FIG. 16 is a process flow chart illustrating a binder jetting process.
Figure 17:
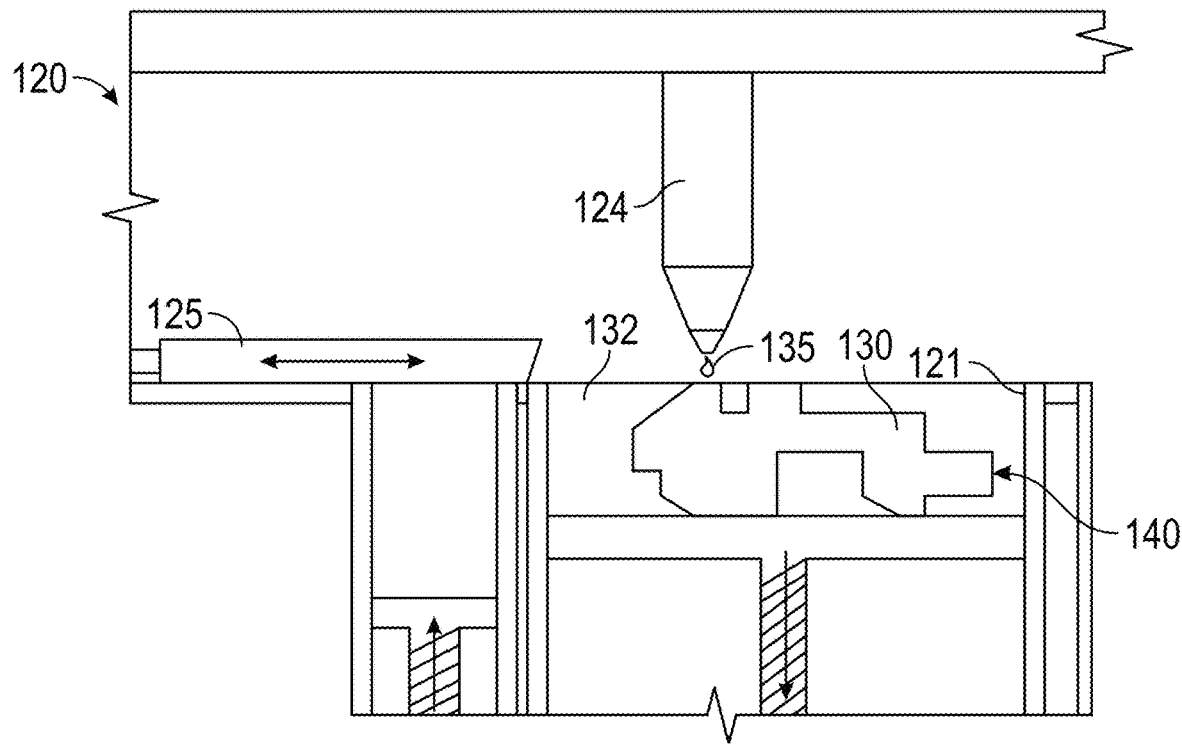
FIG. 17 is an image of an exemplary binder jet machine.
Figure 18:
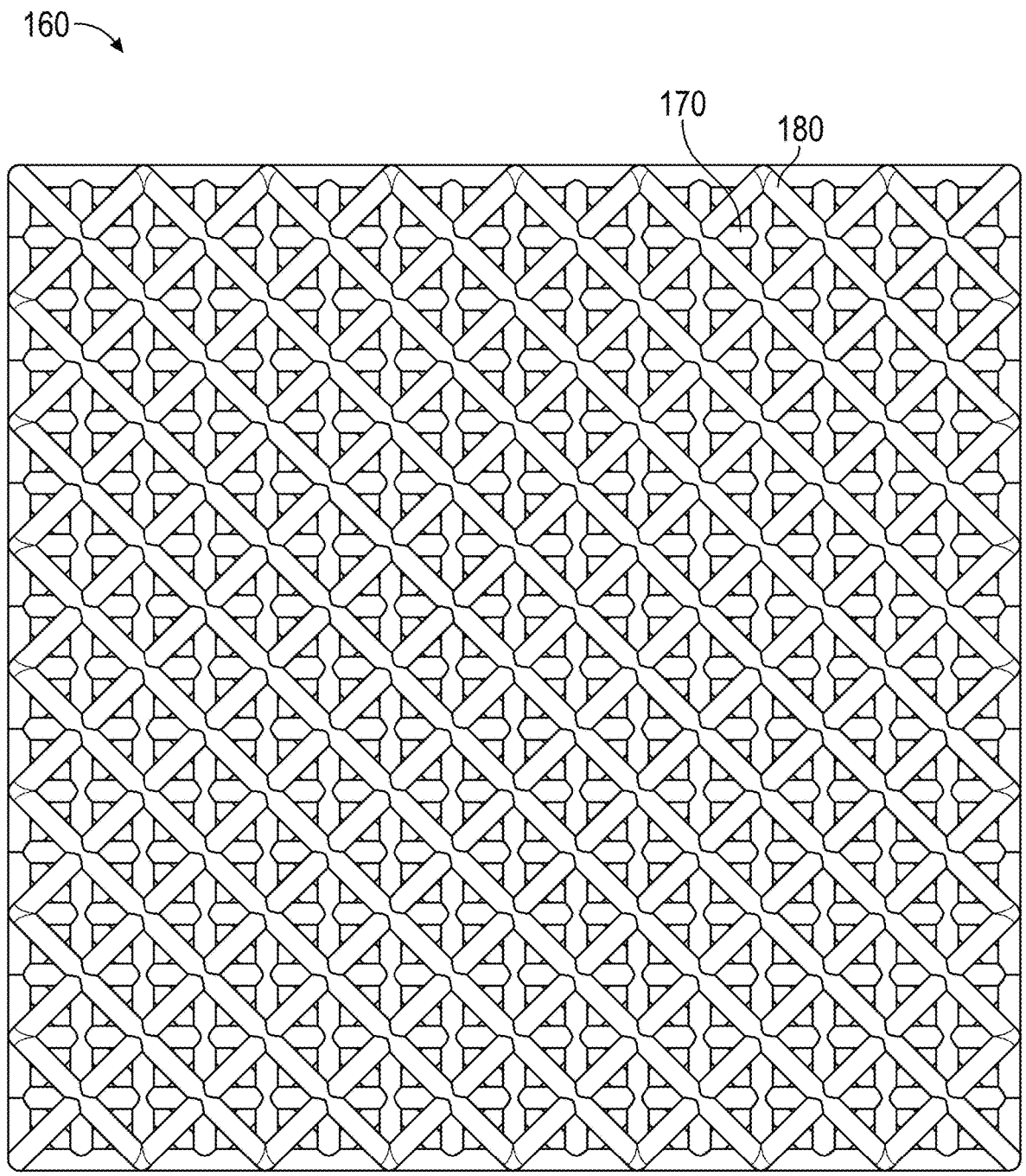
FIG. 18 is a top plan view of a uniform lattice pattern.
Figure 19:
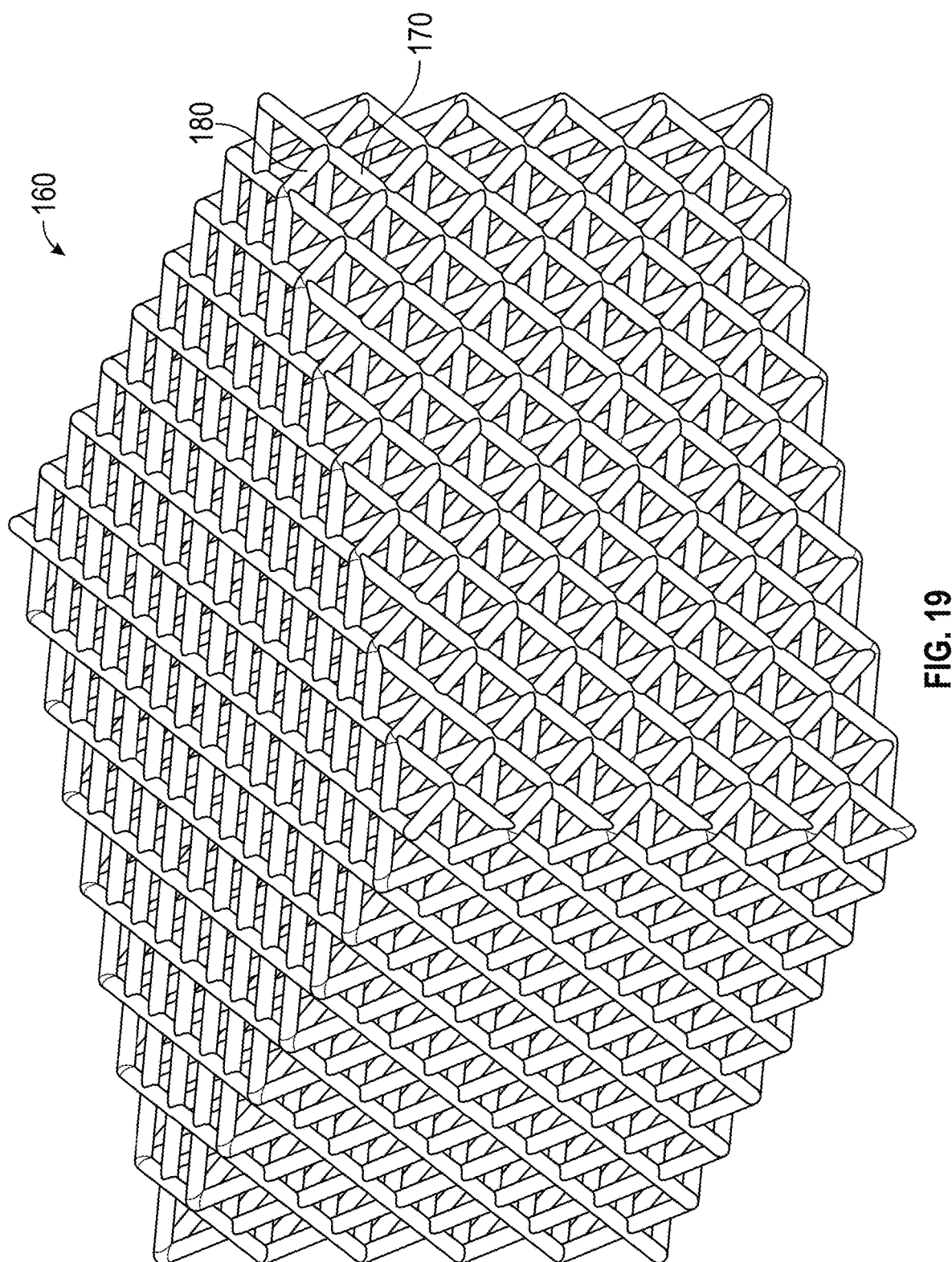
FIG. 19 is a side perspective view of the lattice pattern shown in FIG. 18
Figure 20:
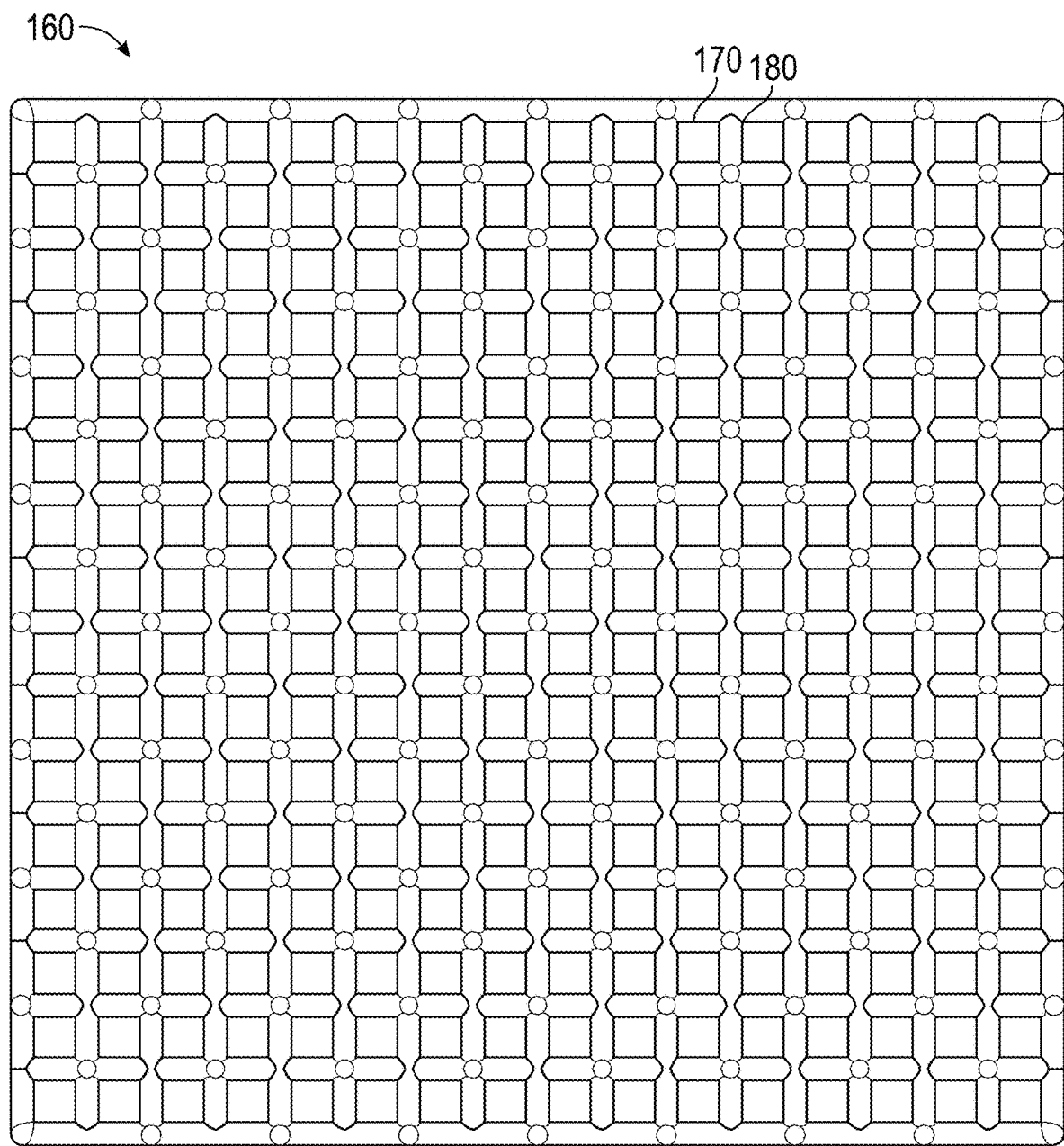
FIG. 20 is a top plan, 40° filtered from XY plane view of the lattice pattern shown in FIG. 18.
Figure 21:
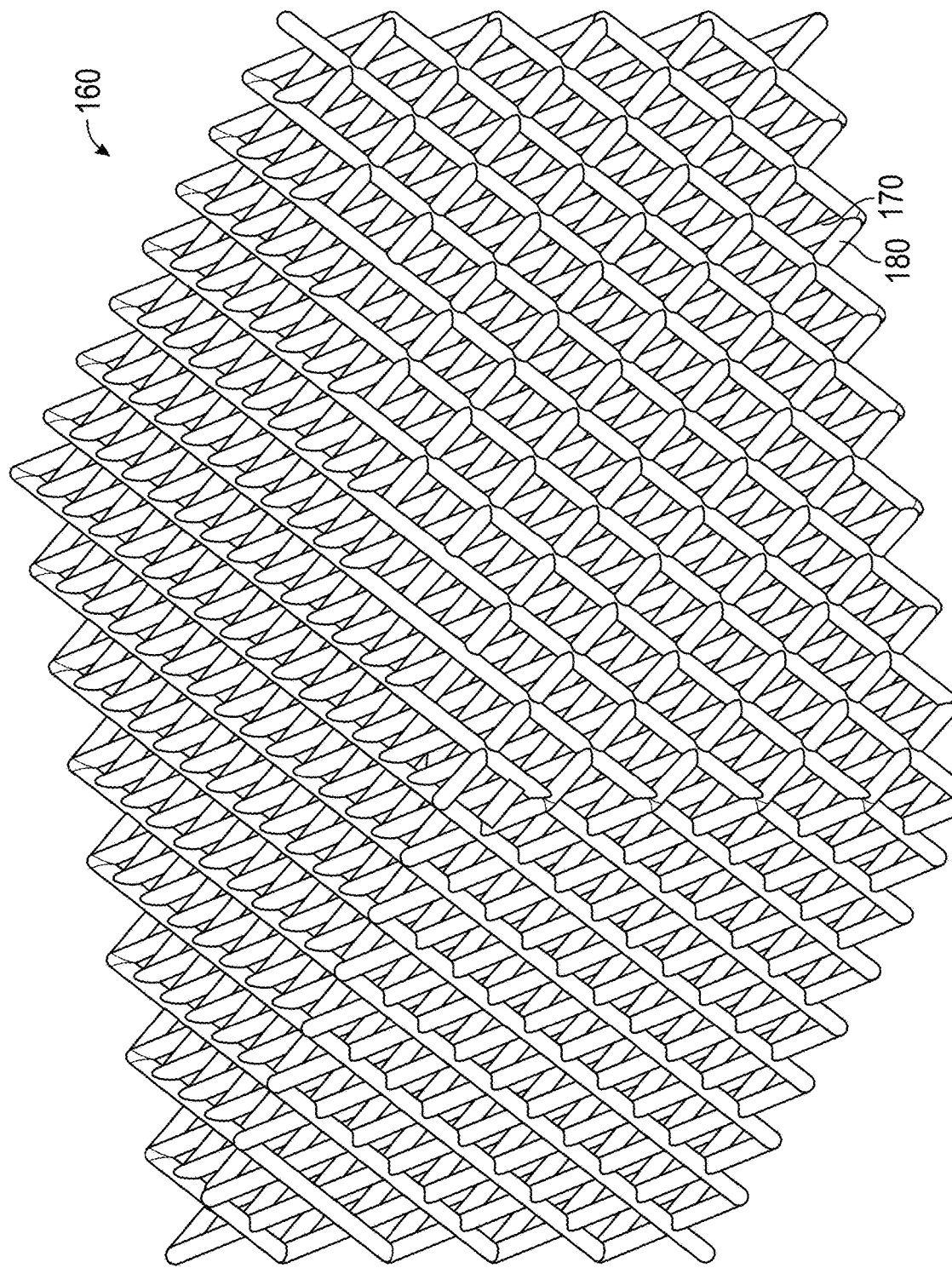
FIG. 21 is a side perspective view of the lattice pattern shown in FIG. 20.
Figure 22:
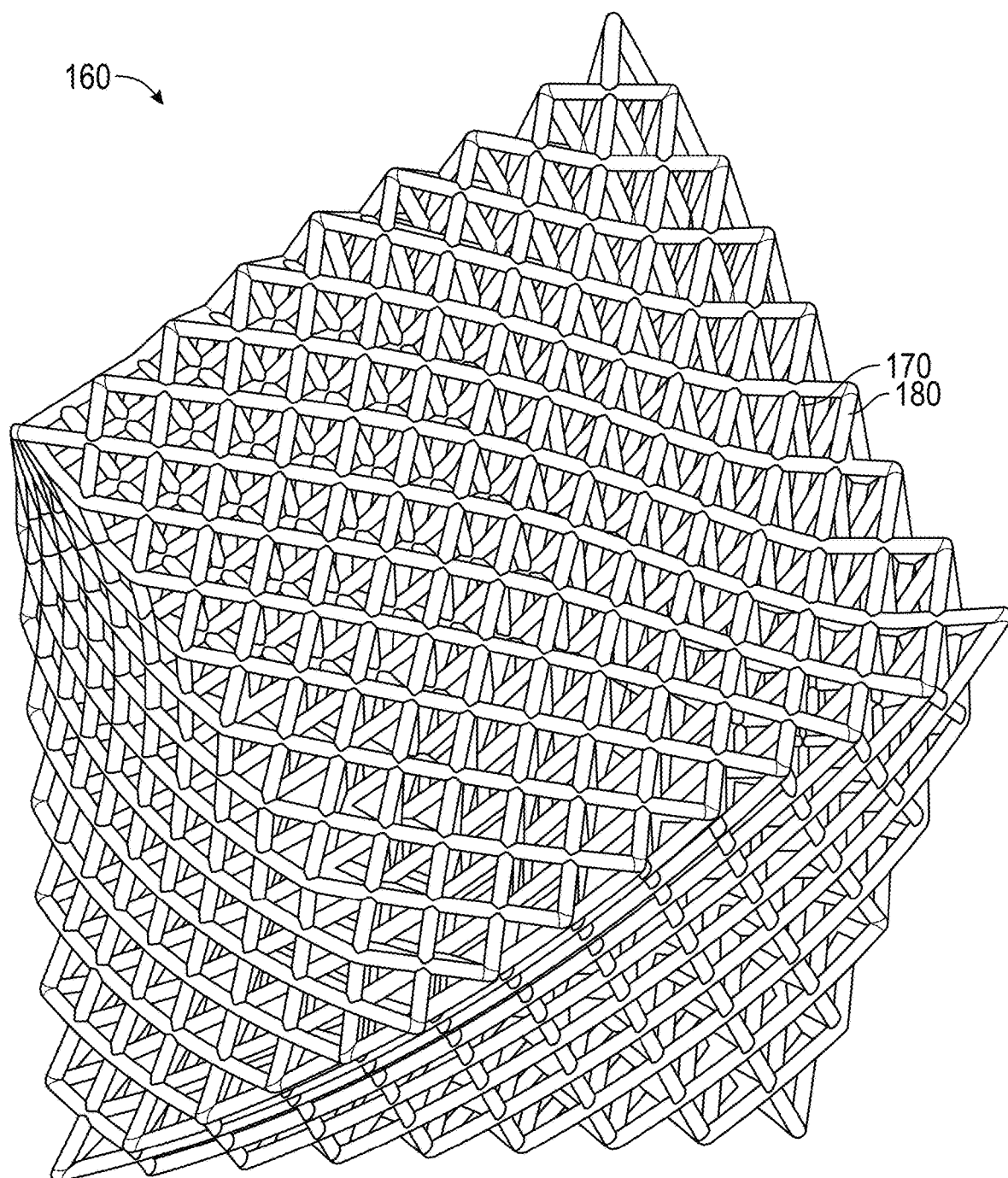
FIG. 22 is a top perspective view of a twisted lattice pattern.
Figure 23:
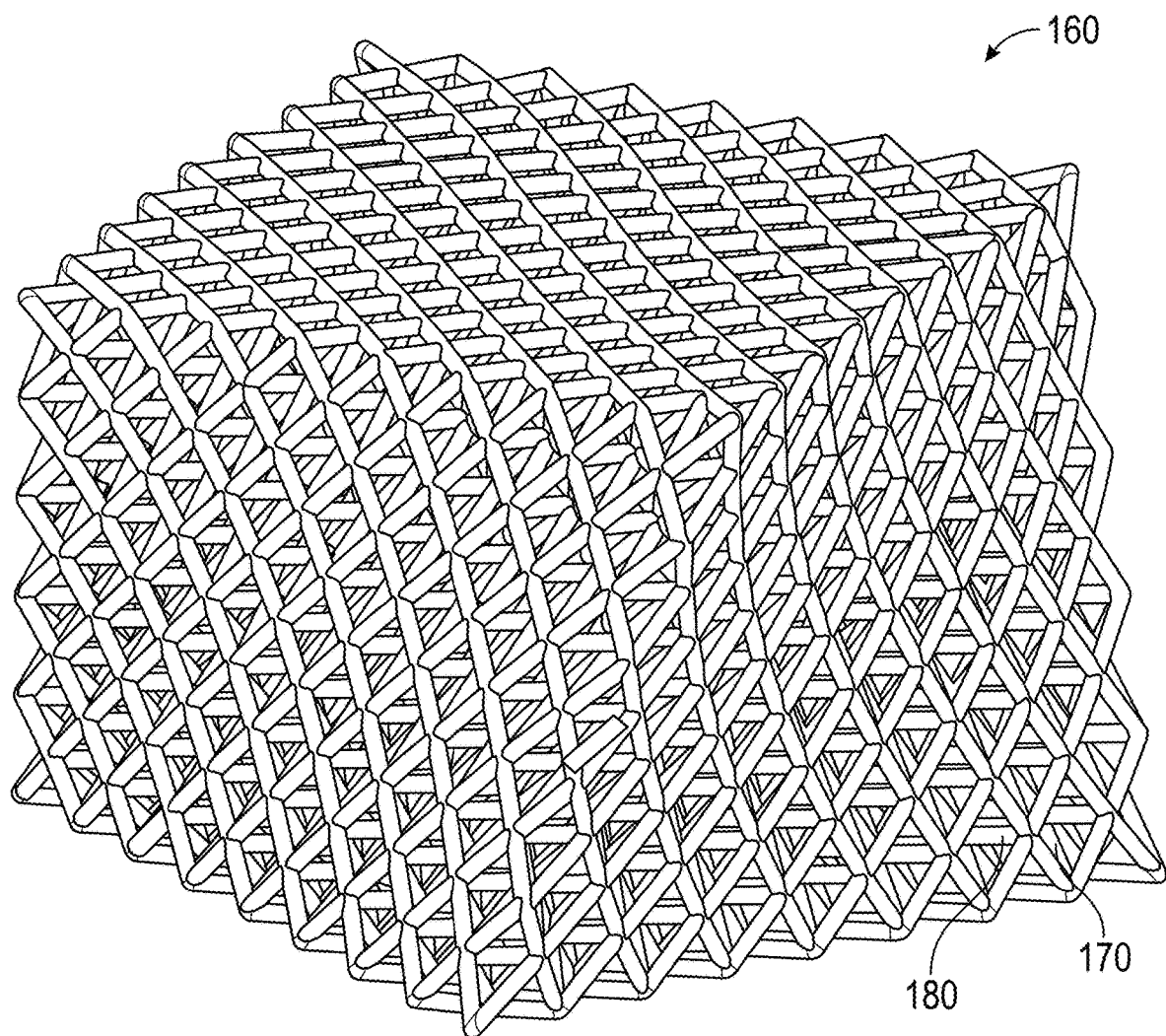
FIG. 23 is a side perspective view of the lattice pattern shown in FIG. 22.
Figure 24:
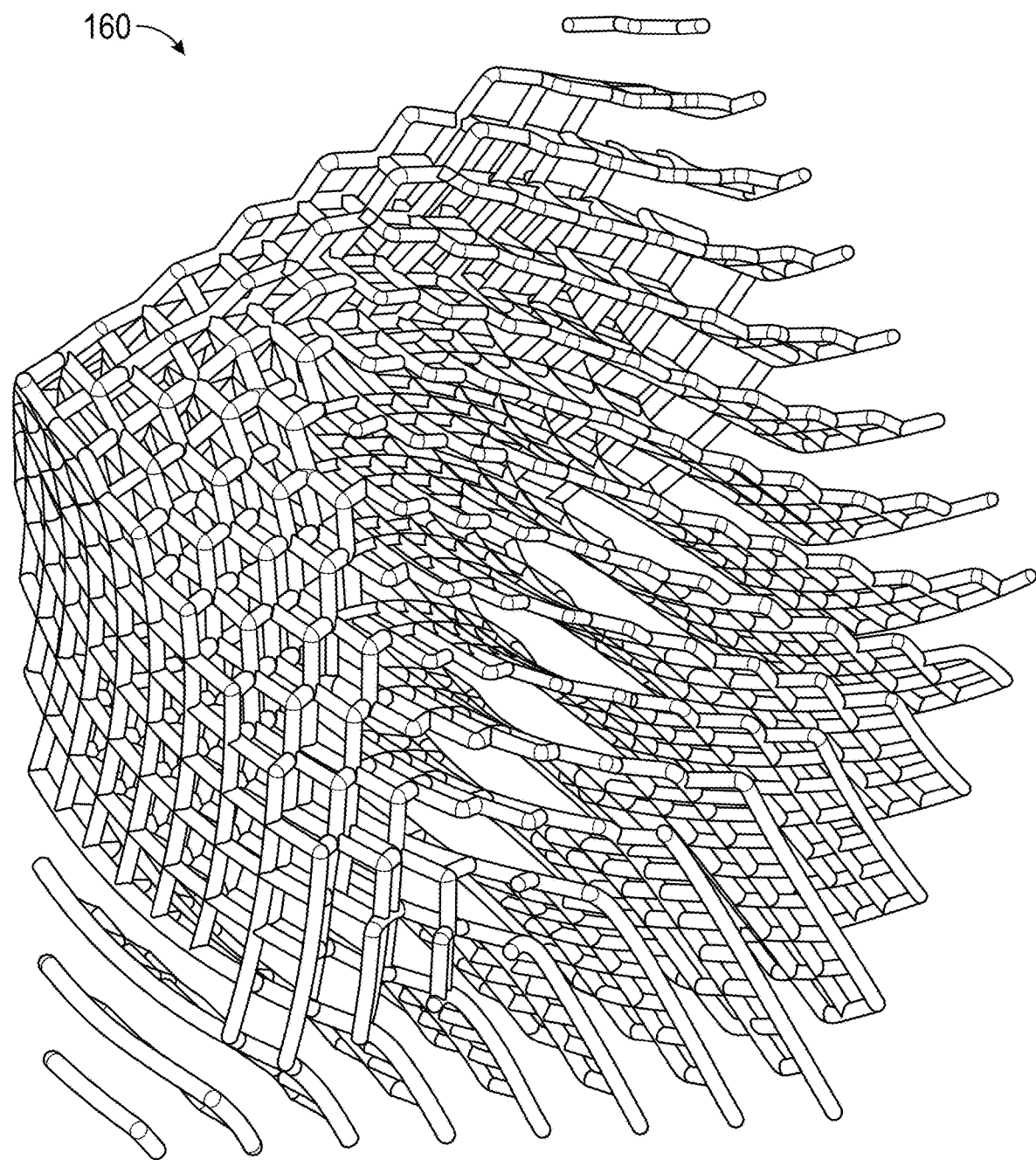
FIG. 24 is a top perspective, 40° filtered from XY plane view of the lattice pattern shown in FIG. 22.
Figure 25:
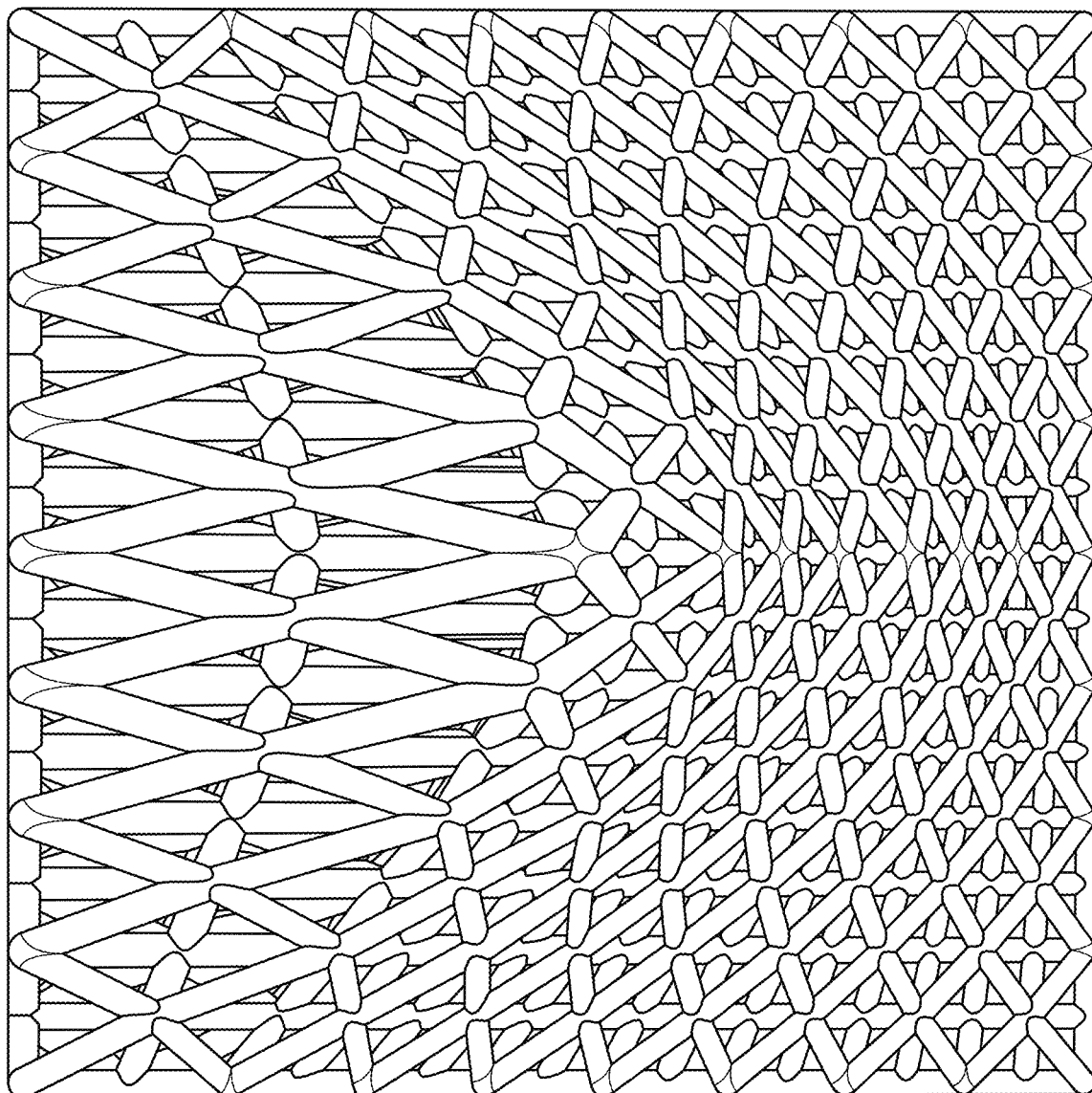
FIG. 25 is a top plan view of a variable density lattice pattern.
Figure 26:
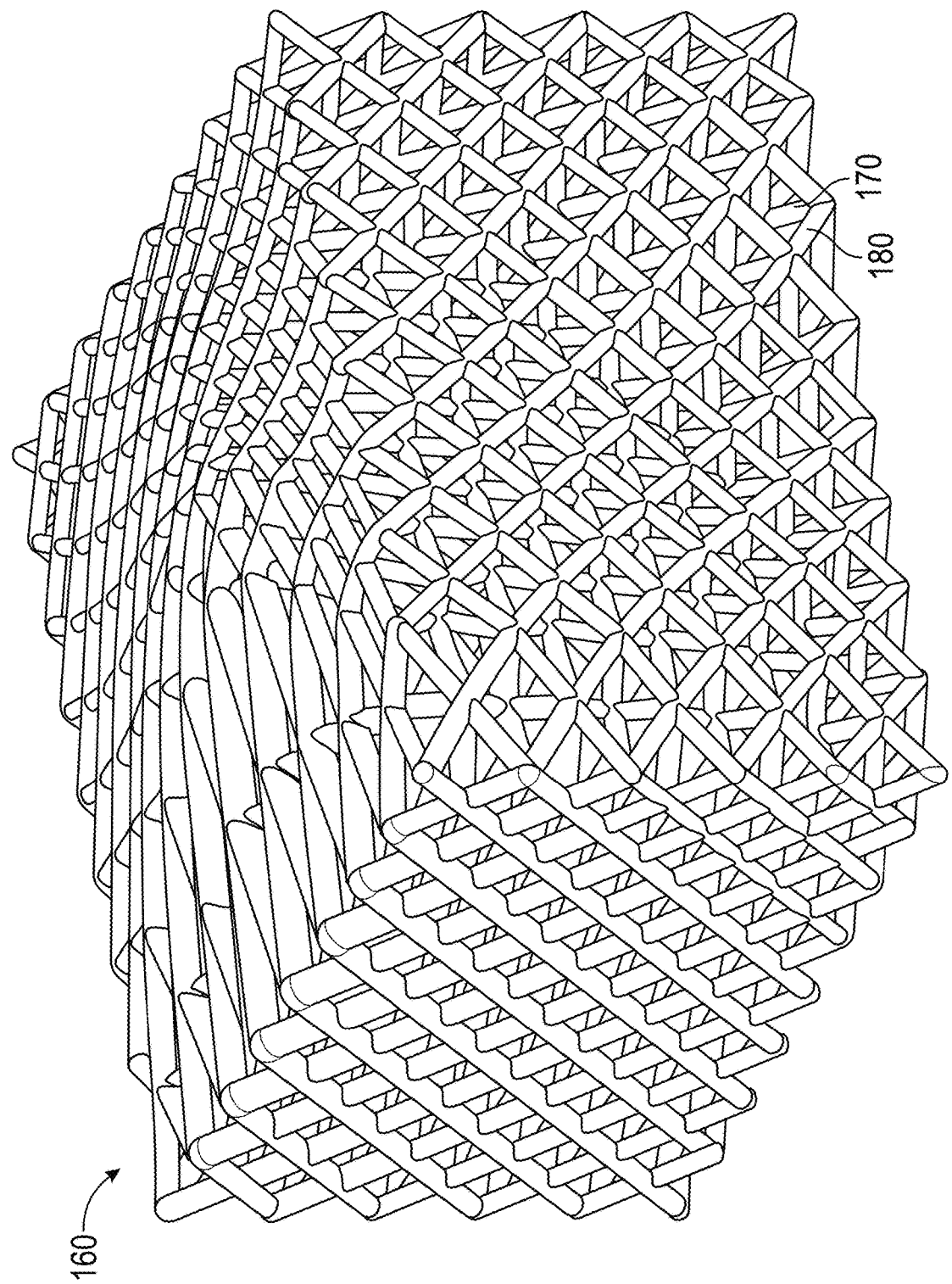
FIG. 26 is a side perspective view of the lattice pattern shown in FIG. 25.
Figure 27:
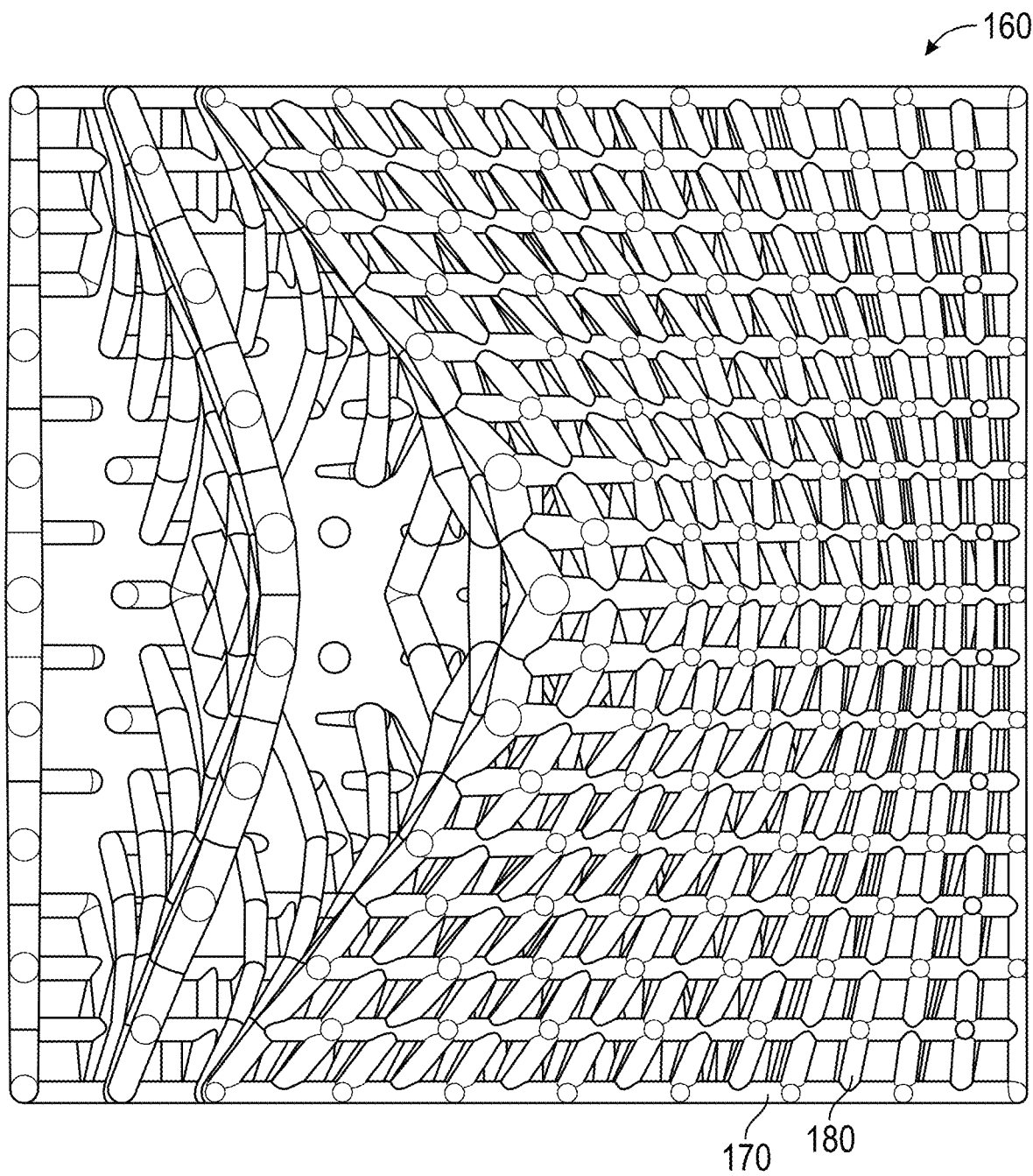
FIG. 27 is a top plan, 40° filtered from XY plane view of the lattice pattern shown in FIG. 25.
Figure 28:
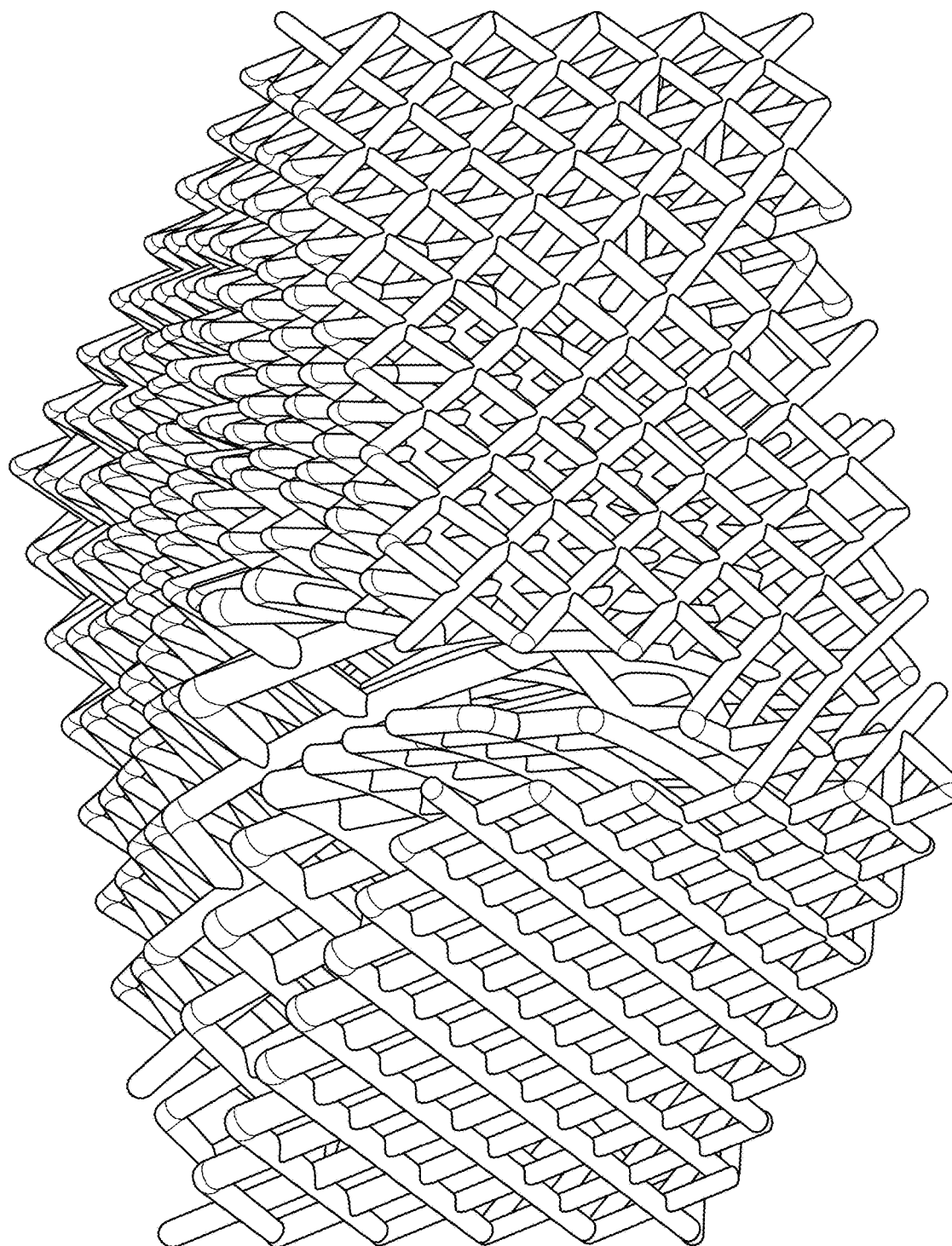
FIG. 28 is a side perspective view of the lattice pattern shown in FIG. 27.

Though the support members 20 disclosed herein may, in limited circumstances, be manufactured via investment casting, plastic injection molding, compression molding, forging, forming, and metal injection molding, they are preferably formed via 3D printing, and most preferably via binder jetting. A preferred binder jet process 100 is illustrated in FIGS. 16 and 17, and includes a first step 111 of spreading layers of powder 130 evenly across the build plate 122 of a binder jet machine 120; this step can be performed manually or with a re-coater or roller device 125. This occurs in the build box 121 portion of the binder jet machine 120, where a build plate 122 lowers as each layer of powder 130 is applied. In a second step 112, a printer head 124 deposits liquid binder 135 on the appropriate regions for each layer of powder 130, leaving unbound powder 132 within the build box 121. In a third step 113, the binder bonds adjacent powder particles together. In a fourth step 114, the first and second steps 111, 112 are repeated as many times as desired by the manufacturer to form a green (unfinished) part 140 with an intended geometry.

In an optional fifth step 115, a portion of the binder 135 is removed using a debinding process, which may be via a liquid bath or by heating the green part to melt or vaporize the binder. In a sixth step 116, the green part 140 is sintered in a furnace, where, at the elevated temperature, the metal particles repack, diffuse, and flow into voids, causing a contraction of the overall part. As this sintering step 116 continues, adjacent particles eventually fuse together, forming a final part 240, examples of which are shown in FIGS. 39-44. This process causes 10-25% shrinkage of the part from the green state 140 to its final form 240, and the final part has a void content that is less than 10% throughout. In some embodiments, the debinding and sintering steps 115, 116 may be conducted in the same furnace. In an optional step 117, before the binder jet process 110 begins, optimization software can be used to design a high performance club head or component in CAD. This step allows the manufacturer to use individual player measurements, club head delivery data, and impact location in combination with historical player data and machine learning, artificial intelligence, stochastic analysis, and/or gradient based optimization methods to create a superior club component or head design.

Though binder jetting is a powder-based process for additive manufacturing, it differs in key respects from other directed energy powder based systems like DMLS, DMLM, and EBAM. The binder jet process 110 provides key efficiency and cost saving improvements over DMLM, DMLS, and EBAM that makes it uniquely suitable for use in golf club component manufacturing. For example, binder jetting is more energy efficient because it is not performed at extremely elevated temperatures and is a much less time consuming process, with speeds up to one hundred times faster than DMLS. The secondary debinding step 115 and sintering step 116 are batch processes which help keep overall cycle times low, and green parts 140 can be stacked in a binder jet machine 120 in three dimensions because the powder is generally self-supporting during the build process, obviating the requirement for supports or direct connections to a build plate. Therefore, because there is no need to remove beams, members, or ligaments because of length, aspect ratio, or overhang angle requirements, lattice structures can take any form and have a much wider range of geometries than are possible when provided by prior art printing methods.

The binder jet process 110 also allows for printing with different powdered materials, including metals and non-metals like plastic. It works with standard metal powders common in the metal injection molding (MIM) industry, which has well-established and readily available powder supply chains in place, so the metal powder used in the binder jet process 110 is generally much less expensive than the powders used in the DMLS, DMLM, and EBAM directed energy modalities. The improved design freedom, lower cost and faster throughput of binder jet makes it suitable for individually customized club heads, prototypes, and larger scale mass-produced designs for the general public.

Lattice Structures

The binder jet process 110 described above allows for the creation of lattice structures, including those with beams that would otherwise violate the standard overhang angle limitation set by DMLM, DMLS, and EBAM. It can also be used to create triply periodic minimal surfaces (TPMS) and non-periodic or non-ordered collections of beams.

Compressing or otherwise reducing the size of cells in a section of the lattice increases the effective density and stiffness in those regions. Conversely, expanding the size of the cells is an effective way to intentionally design in a reduction of effective density and stiffness. Effective density is defined as the density of a unit of volume in which a fully dense material may be combined with geometrically designed-in voids, which can be filled with air or another material, and/or with another or other fully dense materials. The unit volume can be defined using a geometrically functional space, such as the lattice cell shown in FIG. 37-38 or a three dimensional shape fitted to a typical section, and in particular the volume of a sphere with a diameter that is three to five times the equivalent diameter of the nearest beam or collection of beams. The binder jet process allows for the creation of a structure with a uniform final material density of at least 90%, which contrasts with previous uses of DMLM, DMLS, and EBAM to change the actual material density by purposely creating unstructured porosity in parts.

Figure 37:
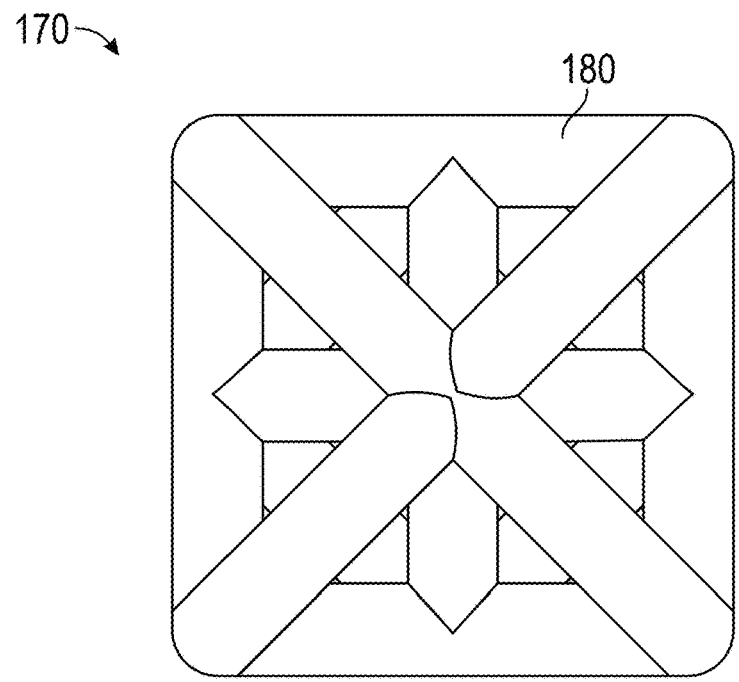
FIG. 37 is a top plan view of a unit cell of a lattice.
Figure 38:
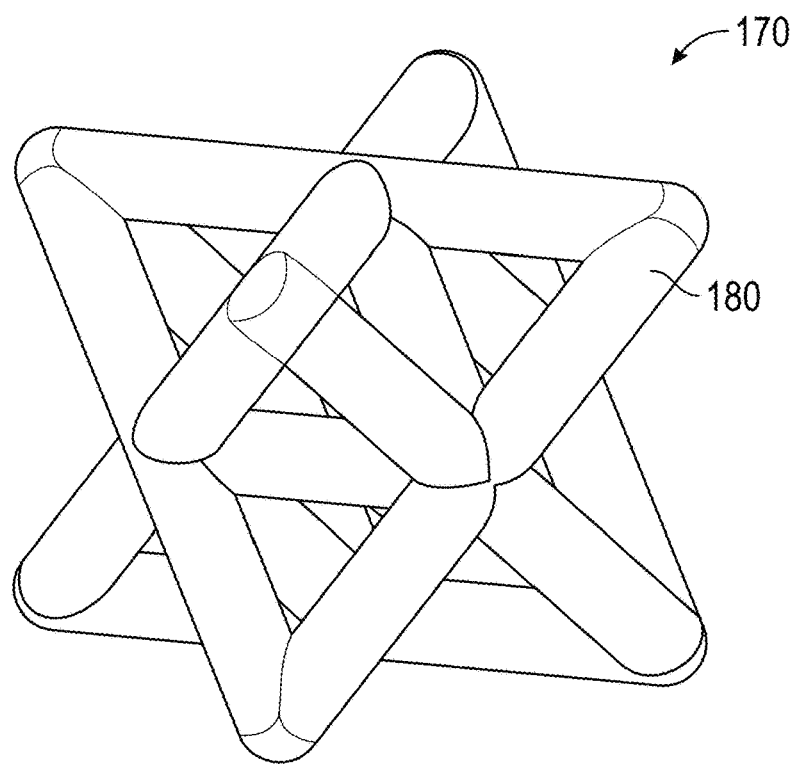
FIG. 38 is a side perspective view of the unit cell shown in FIG. 37.

Examples of lattice structures 160 that can be created using the process 10 described above are shown in FIGS. 18-36, and include warped, twisted, distorted, curved, and stretched lattices that can optimize the structure for any given application. Individual lattice cells 170 are shown in FIGS. 37-38, and may be used in addition to or instead of more complex lattice structures 60. FIGS. 20, 21, 24-25, 27, 31, 35 and 36 illustrate what the more complicated structures look like when a 40° overhang limitation is applied: a significant portion of the structure is lost. Another benefit of not having an overhang angle limitation is that manufacturers can create less ordered or non-ordered collections of beams. The lattice structures 160 shown herein may have repeating cells 170 or cells with gradual and/or continuously changing size, aspect ratio, skew, and beam diameter. The change rate between adjacent cells 170 and beams 180 may be 10%, 25%, 50%, and up to 100%, and this change pattern may apply to all or only some of the volume occupied by the lattice structure.

Figure 29:
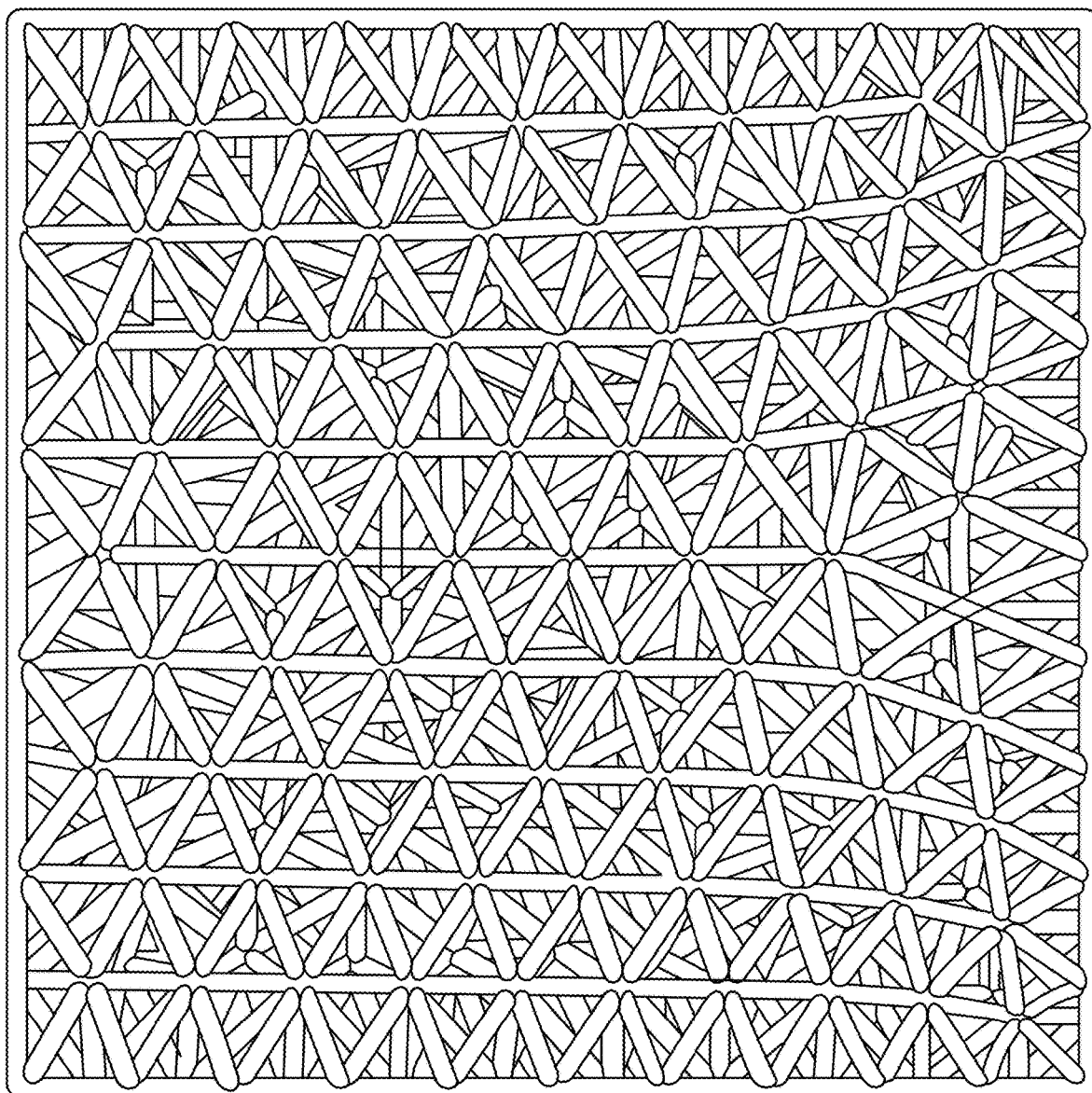
FIG. 29 is a top plan view of a non-ordered collection of beams and tetrahedral cell lattice pattern.
Figure 30:
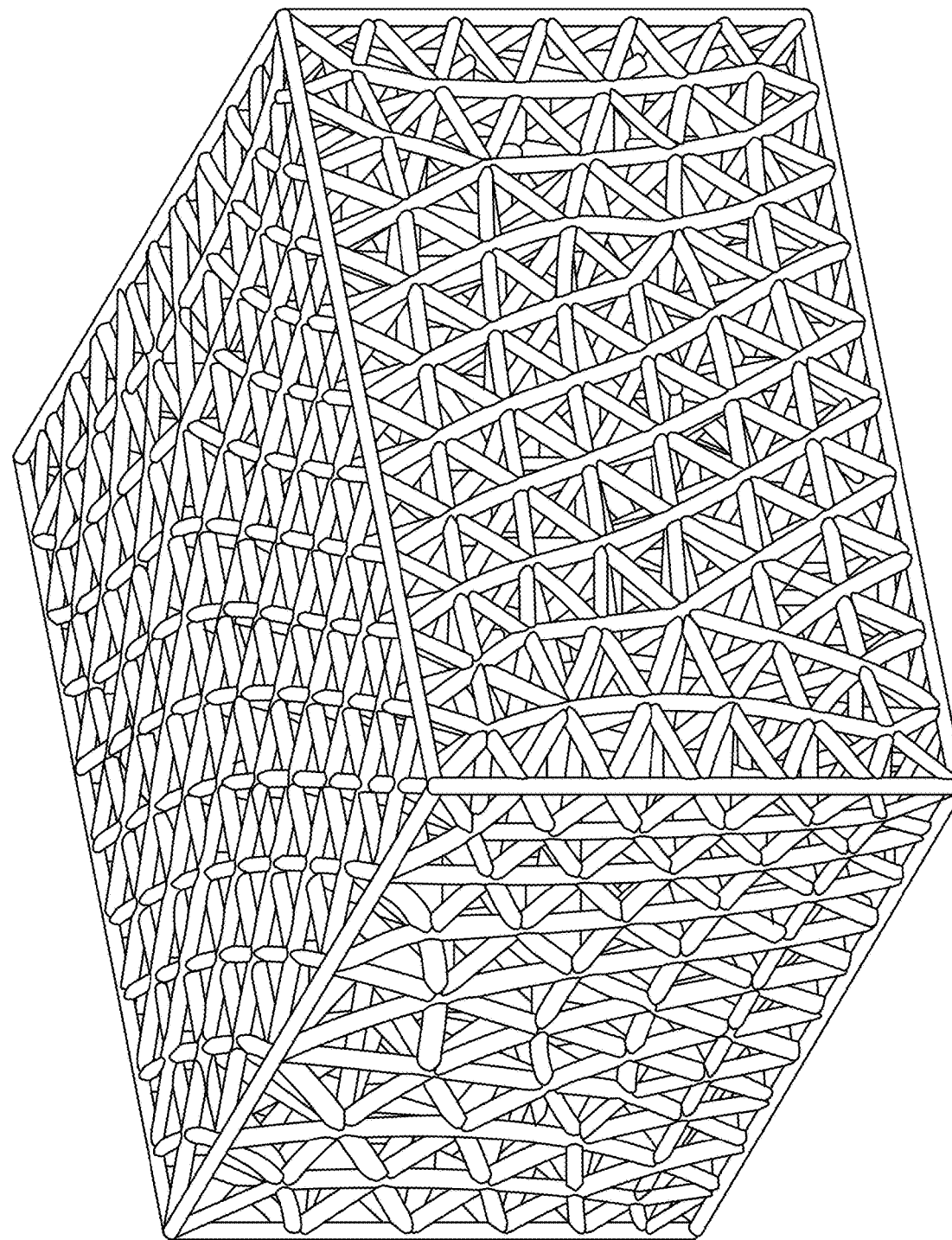
FIG. 30 is a side perspective view of the lattice pattern shown in FIG. 29.
Figure 31:
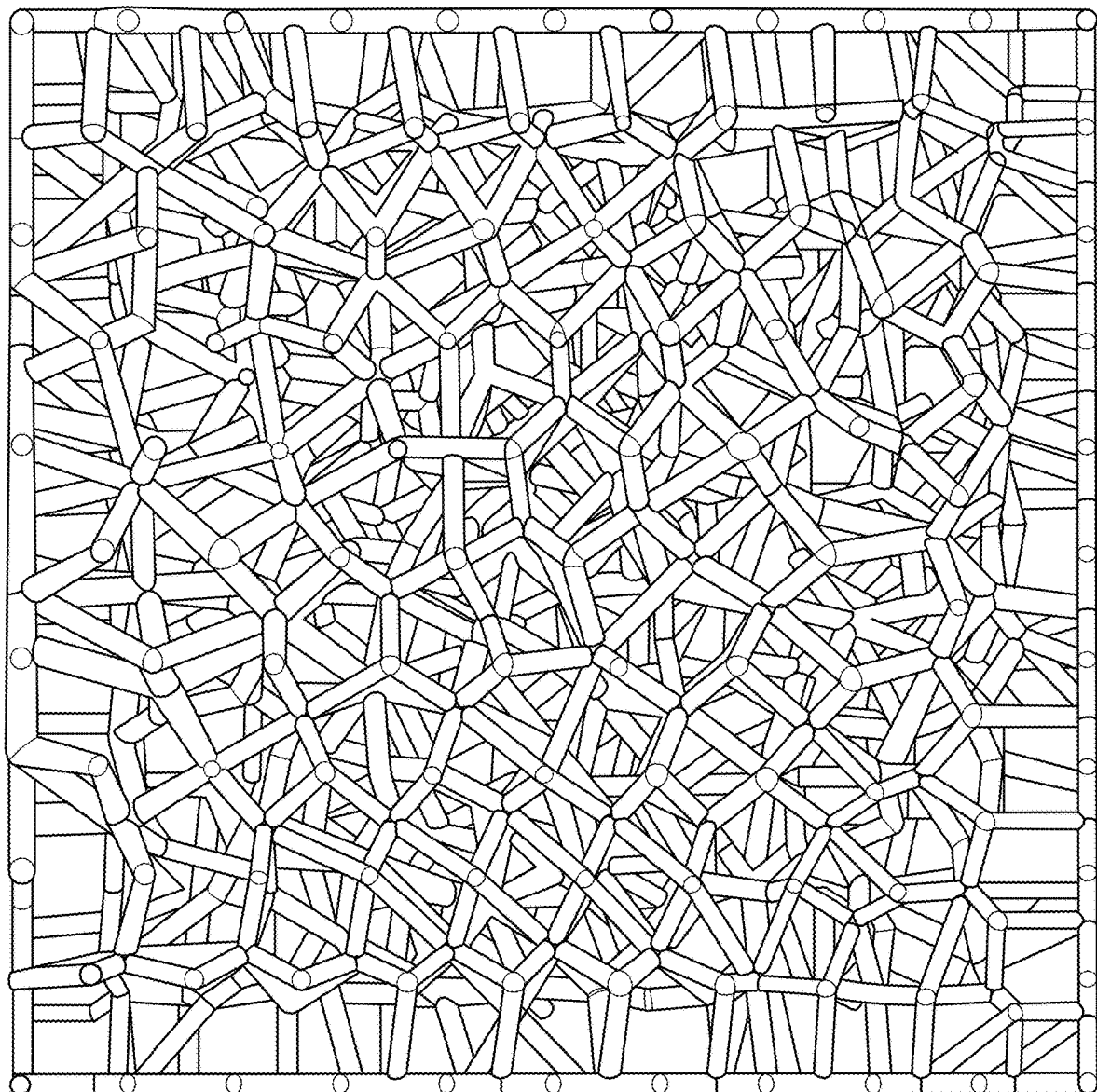
FIG. 31 is a top plan, 40° filtered from XY plane view of the lattice pattern shown in FIG. 29.
Figure 32:
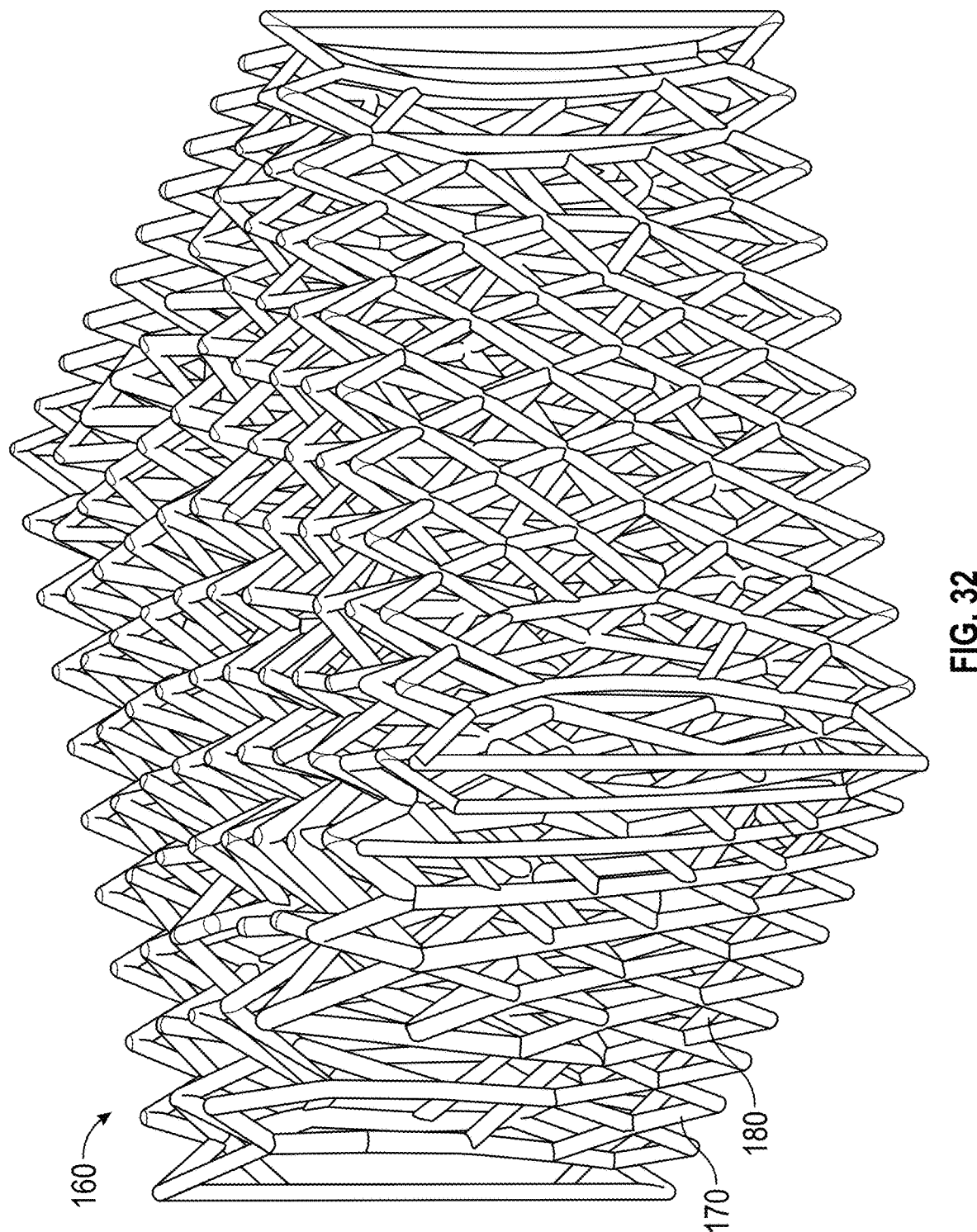
FIG. 32 is a side perspective view of the lattice pattern shown in FIG. 31.
Figure 33:
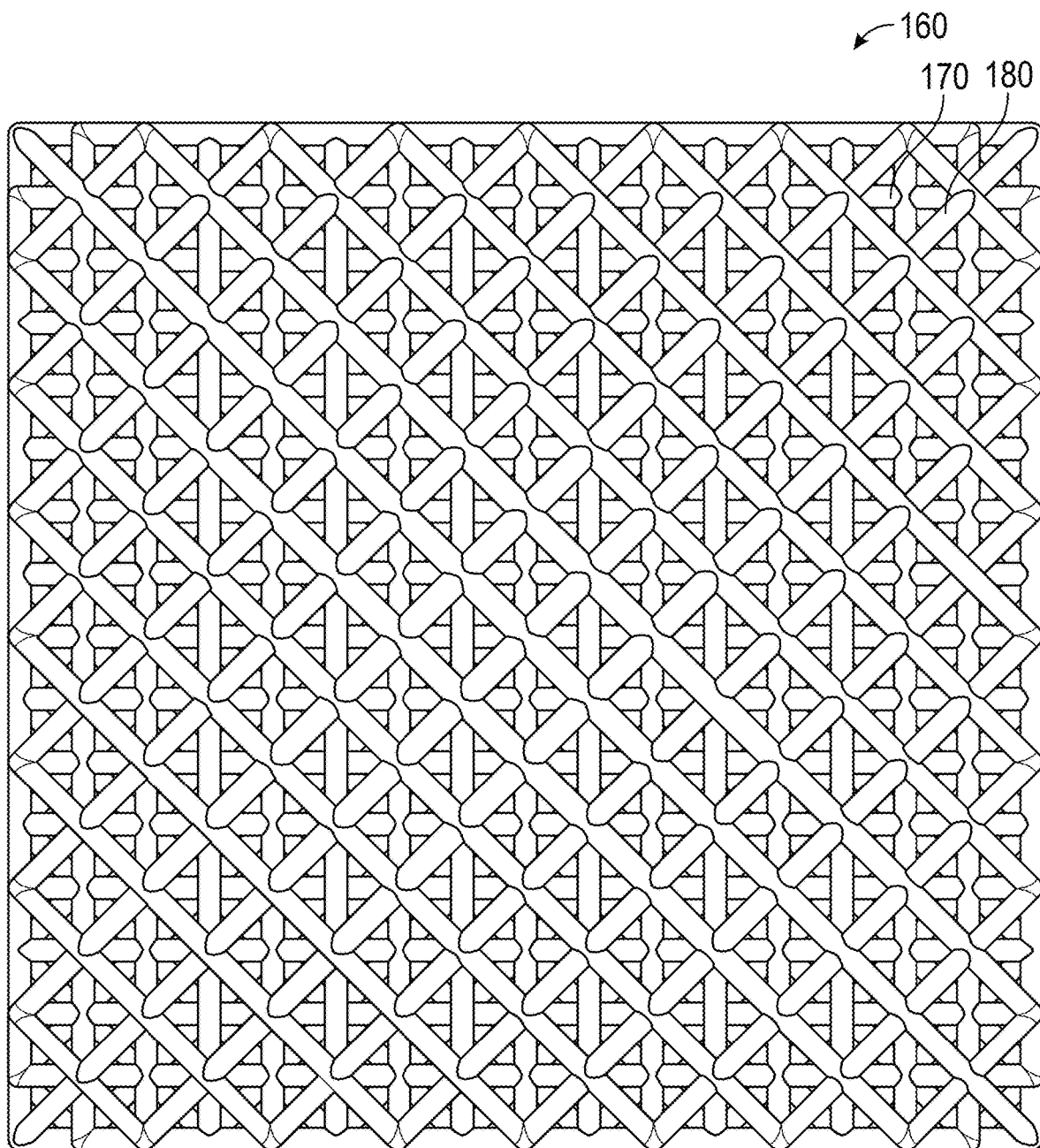
FIG. 33 is top plan view of a conformal, spherical top lattice pattern.
Figure 34:
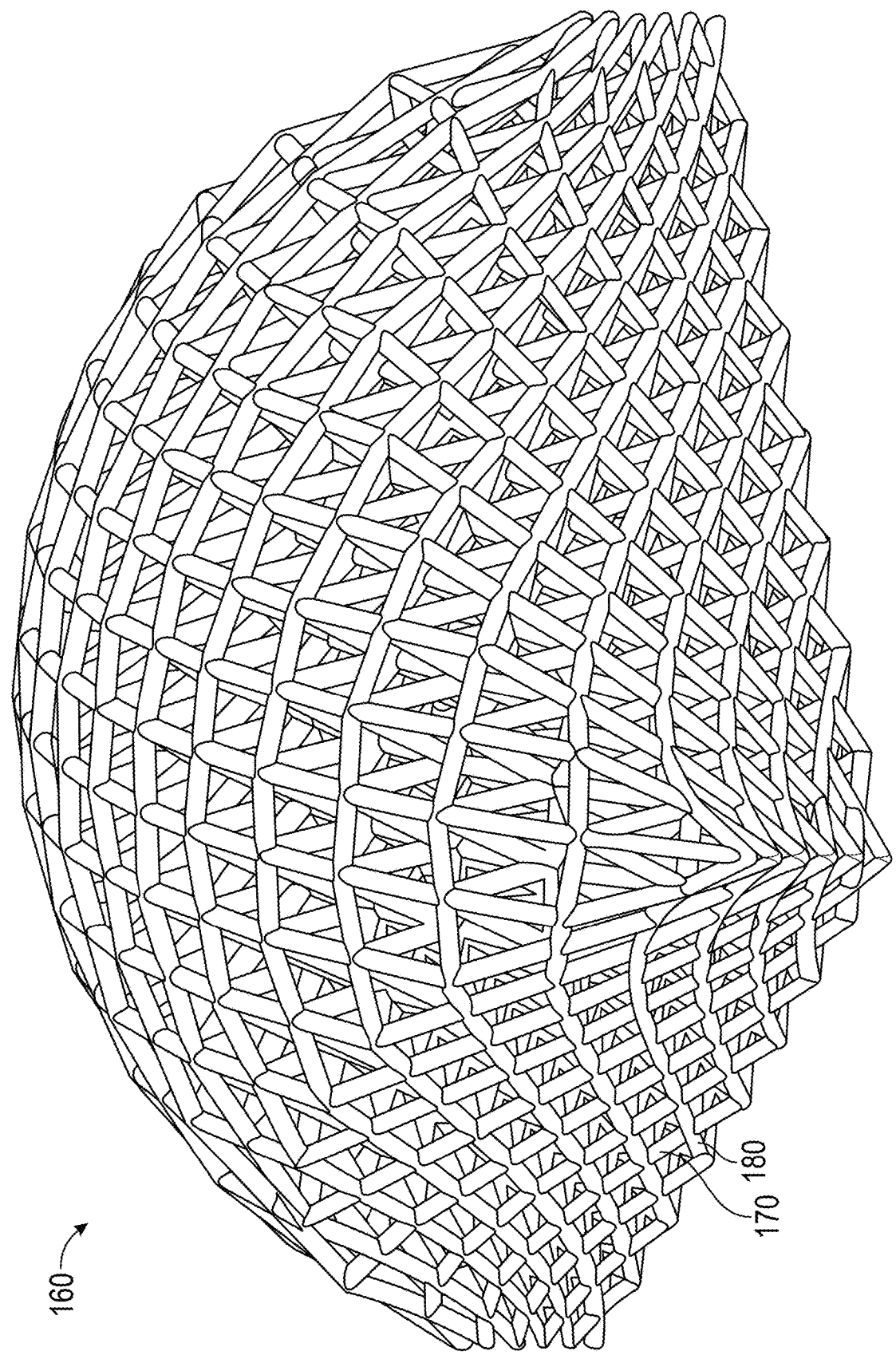
FIG. 34 is a side perspective view of the lattice pattern shown in FIG. 33.
Figure 35:
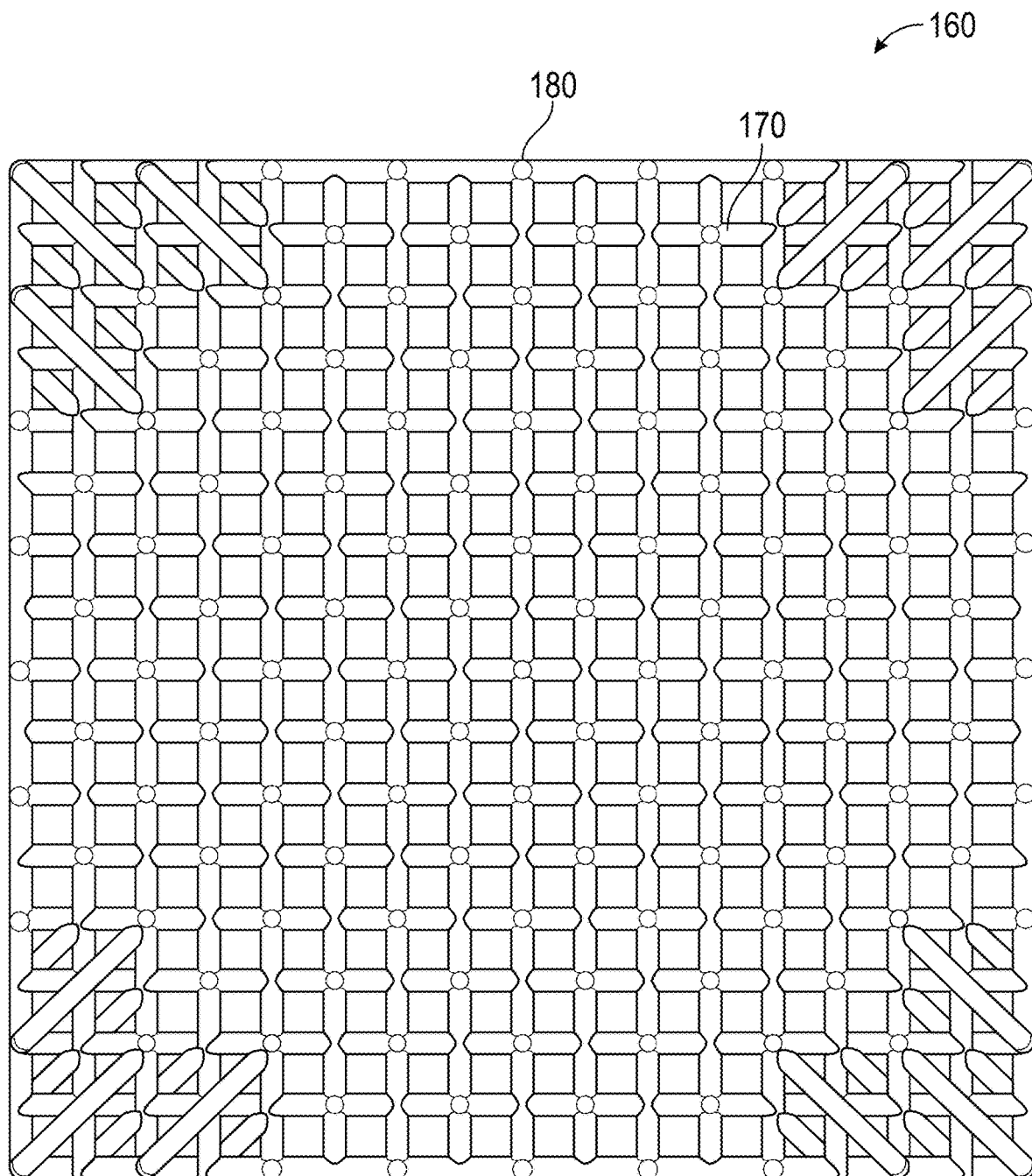
FIG. 35 is a top plan, 40° filtered from XY plane view of the lattice pattern shown in FIG. 33.
Figure 36:
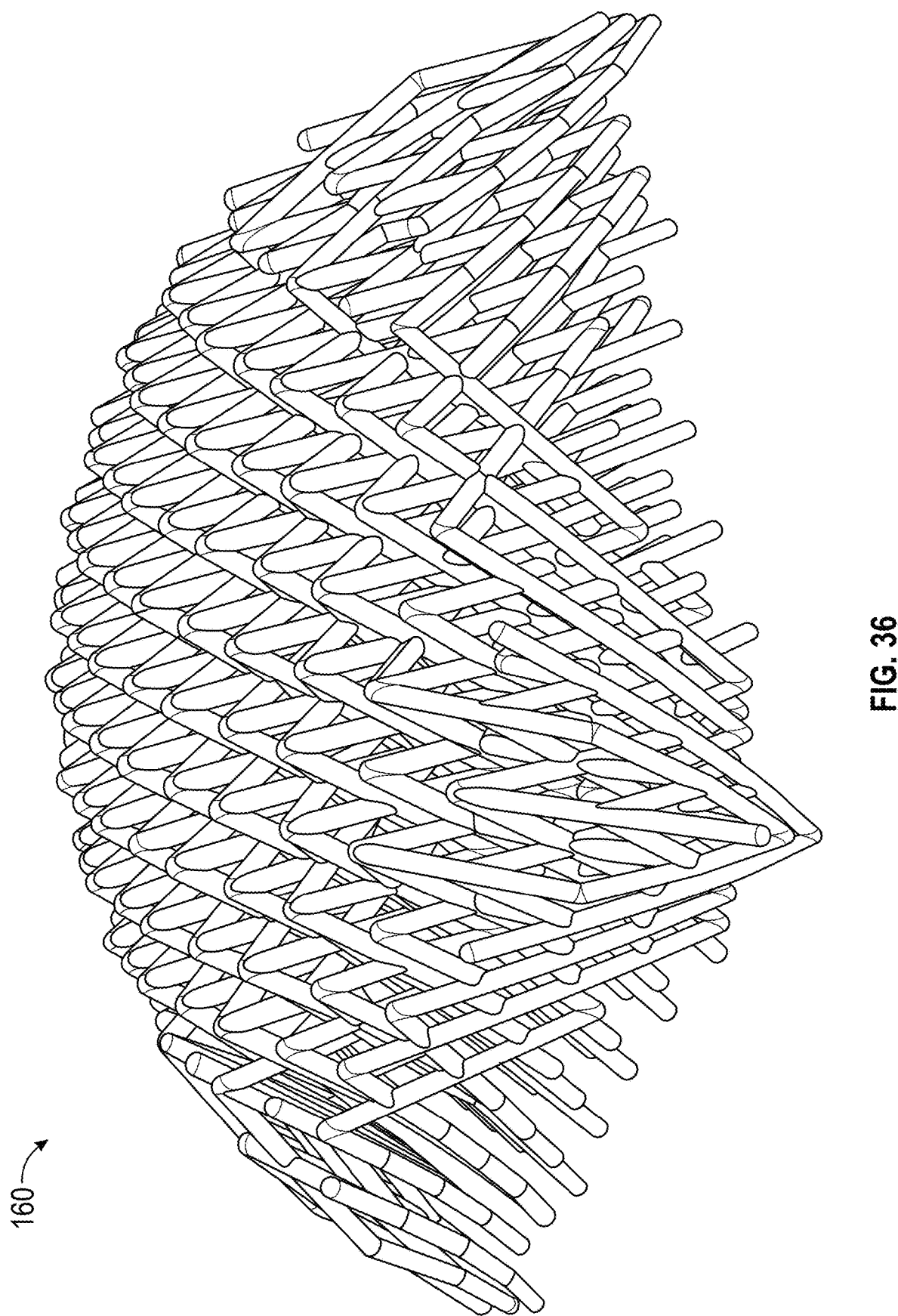
FIG. 36 is a side perspective view of the lattice pattern shown in FIG. 35.

Cell 170 type can change abruptly if different regions of a component need different effective material properties, but size, aspect ratio, skew, beam diameter can then change continuously as distance from the cell type boundary increases. The diameter of the beams 180 may be constant or tapered, and while their cross sections are typically circular, they can also be elliptical. Such structures may take the form of a series of connected tetrahedral cells 170, as shown in FIGS. 29-30. The lack of an overhang constraint allows for the beams 80 to be oriented in any fashion and therefor allows for the generation of a conformal lattice of virtually any size and shape. Modern meshing software also provide quick and simple method by which to fill volumes and vary the lattice density via non-ordered tetrahedral cells.

Tetrahedral cells 170 are also very useful for varying cell size and shape throughout a part.

Lattice Applications in Putter Heads

The binder jet process 110 permits manufacturers to take full advantage of generative design and topology optimization results in putter heads 200, as shown in FIGS. 39-44. The lattice structures 160 disclosed herein can be built into their respective golf club heads in one 3D printing step, or may be formed separately from the golf club head and then permanently affixed to the golf club head at a later time. These designs illustrate the kinds of improvements to golf club head center of gravity (CG), moment of inertia (MOI), stress, acoustics (e.g., modal frequencies), ball speed, launch angle, spin rates, forgiveness, and robustness that can be made when manufacturing constraints are removed via the use of optimization software and 3D printing.

Figure 39:
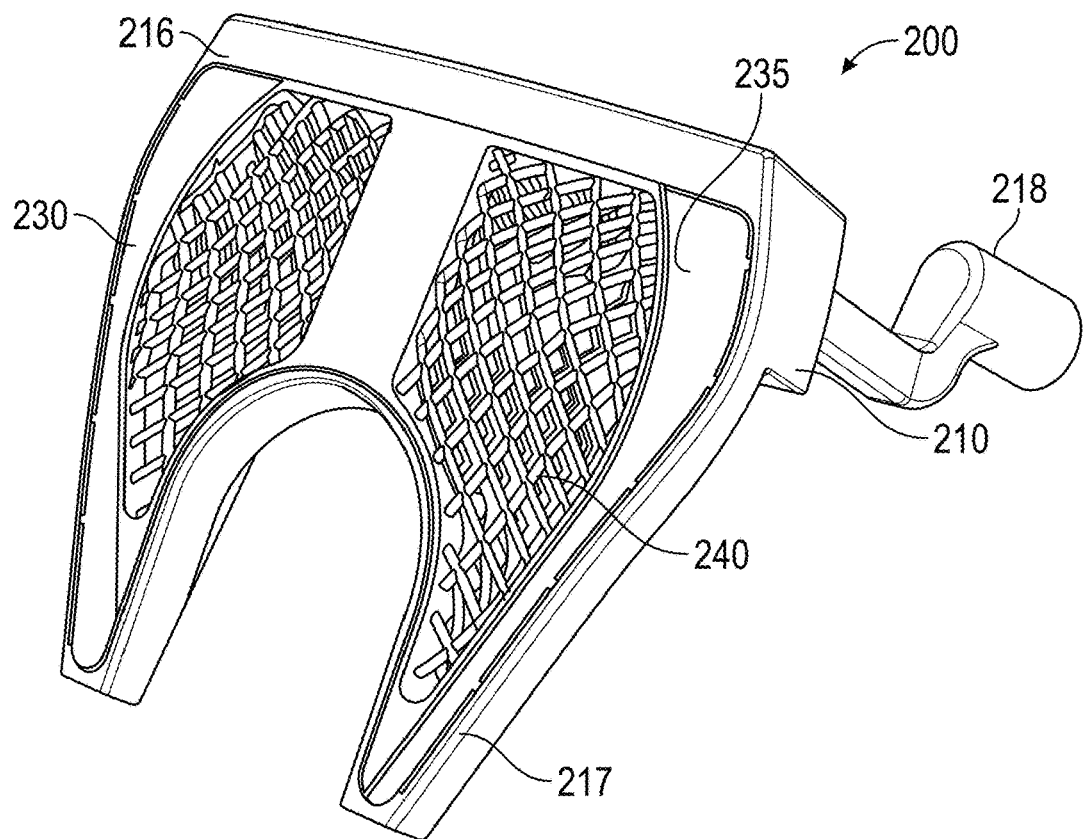
FIG. 39 is a sole perspective view of a putter head with a sole puck formed from a lattice.
Figure 40:
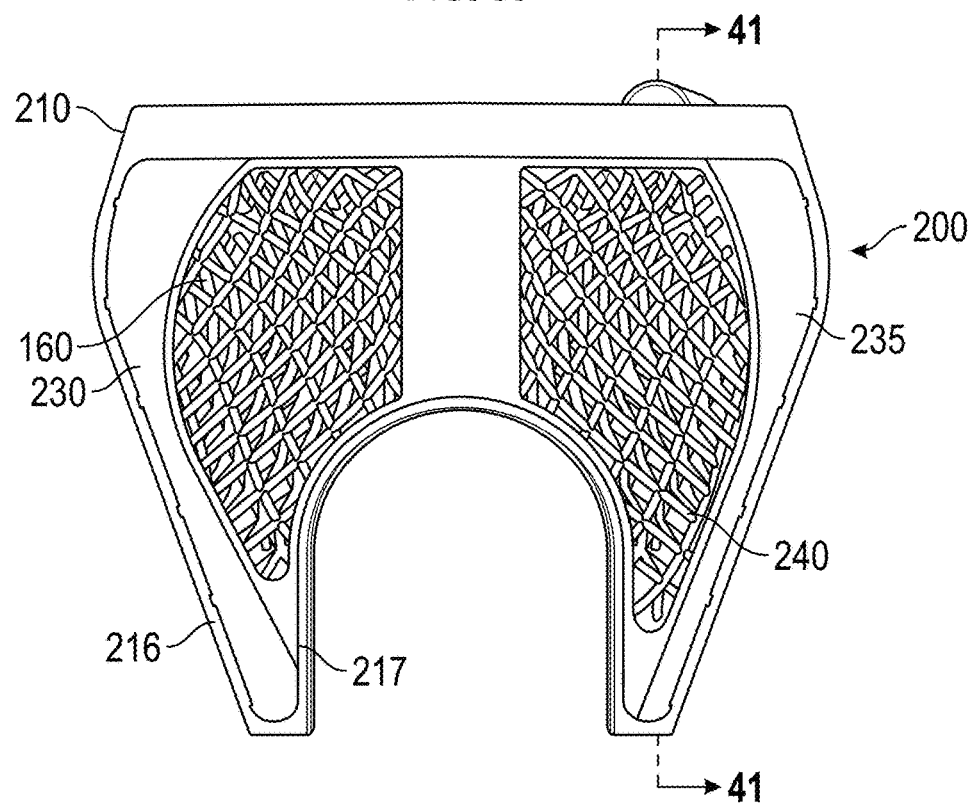
FIG. 40 is a sole plan view of the putter head shown in FIG. 39.
Figure 41:
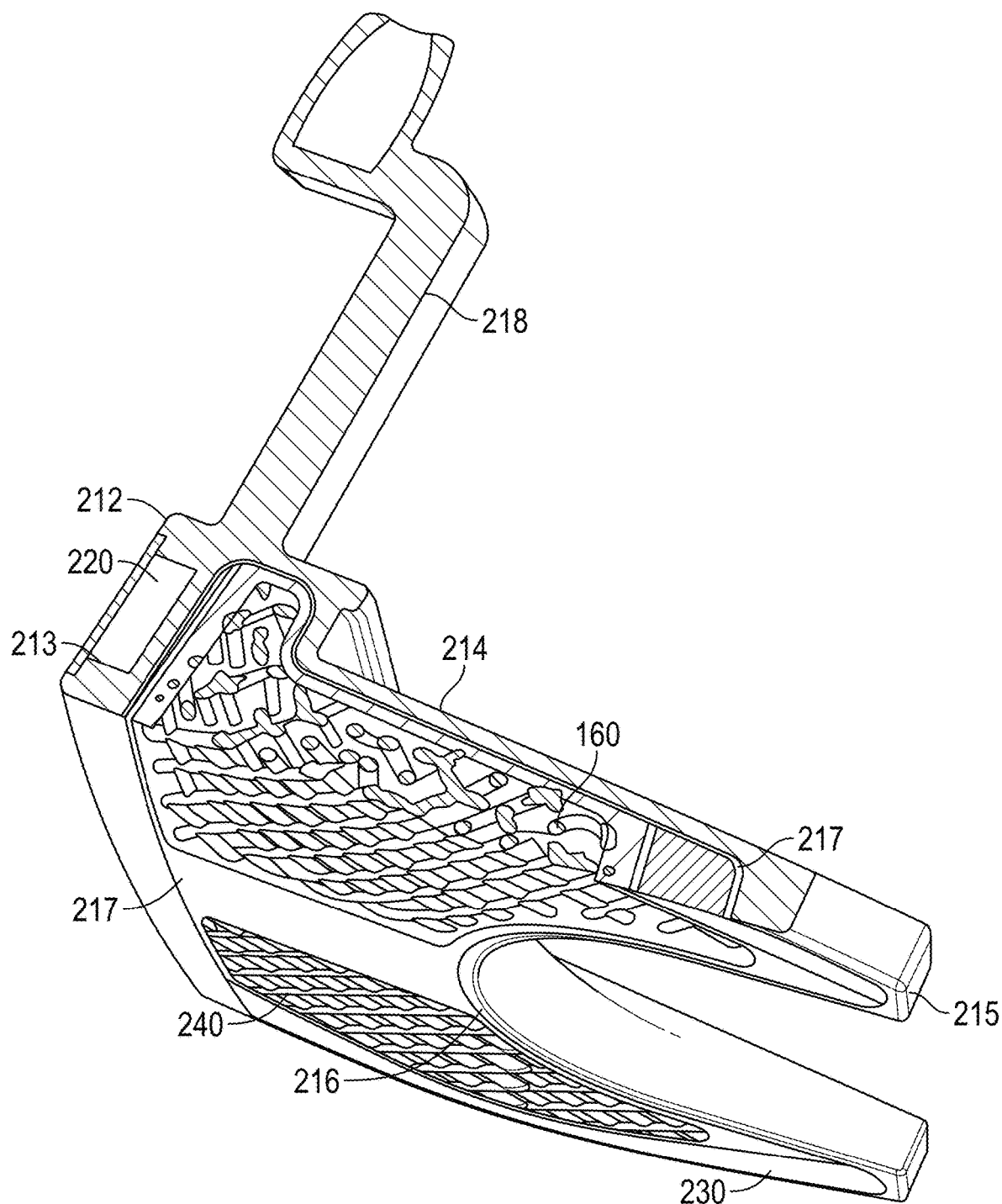
FIG. 41 is a cross-sectional view of the putter head shown in FIG. 39 taken along lines 41-41.

A preferred embodiment of the present invention is shown in FIGS. 39-41. The putter head 200 of this embodiment includes a body 210 with a face portion 212 and a face recess 213, a top portion 214, and a sole portion 216 with a sole recess 217, a face insert 220 disposed within the face recess 213, and sole weights 230, 235 and a sole insert or puck 240 affixed within the sole recess 217 so that the weights 230, 235 are disposed on heel and toe sides of the puck 240. The body 210 of the putter, and particularly the top portion 214, is formed of a metal alloy having a first density and has a body CG. The weights 230, 235 are preferably located as far as possible from the body CG and are composed of a metal alloy having a second density greater than the first density. While the hosel 218 of the embodiment shown in FIGS. 39-41 is formed integrally with the body 210, in other embodiments it may be formed separately from a different material and attached in a secondary step during manufacturing.

The puck 240 is printed using the binder jet process described above from at least one material with a third density that is lower than the first and second densities, and comprises one or more lattice structures 260 that fill the volume of the sole recess 217, freeing up discretionary mass to be used in high-density weighting at other locations on the putter head 200, preferably at the heel and toe edges and/or the rear edge 215. The materials from which the puck 240 may be printed include plastic, nylon, polycarbonate, polyetherimide, polyetheretherketone, and polyetherketoneketone. These materials can be reinforced with fibers such as carbon, fiberglass, Kevlar®, boron, and/or ultra-high-molecular-weight polyethylene, which may be continuous or long relative to the size of the part or the putter, or very short.

Figure 42:
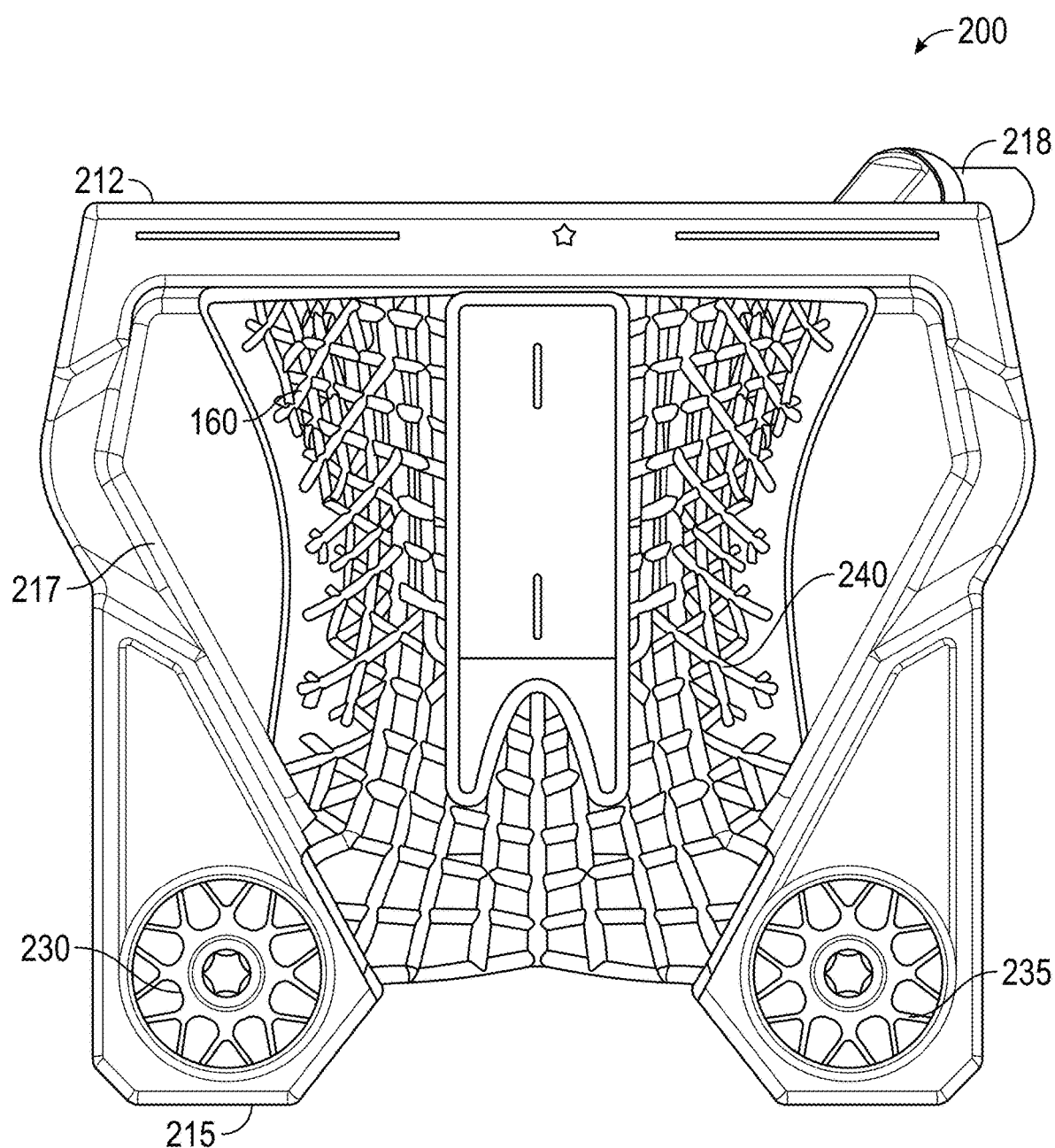
FIG. 42 is a sole plan view of another embodiment of a putter head with a sole puck formed from a lattice.
Figure 43:
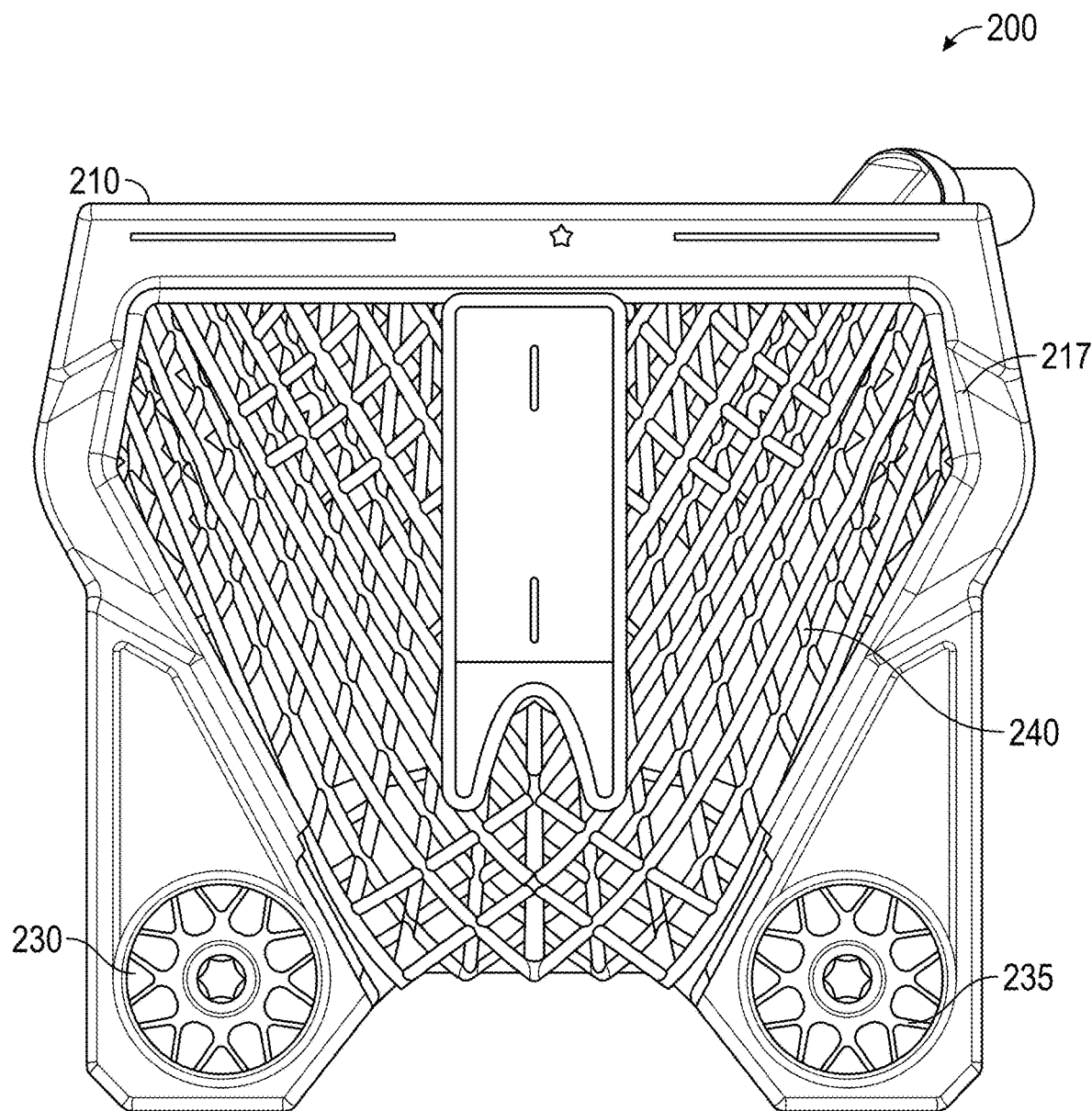
FIG. 43 is a sole plan view of another embodiment of a putter head with a sole puck formed from a lattice.
Figure 44:
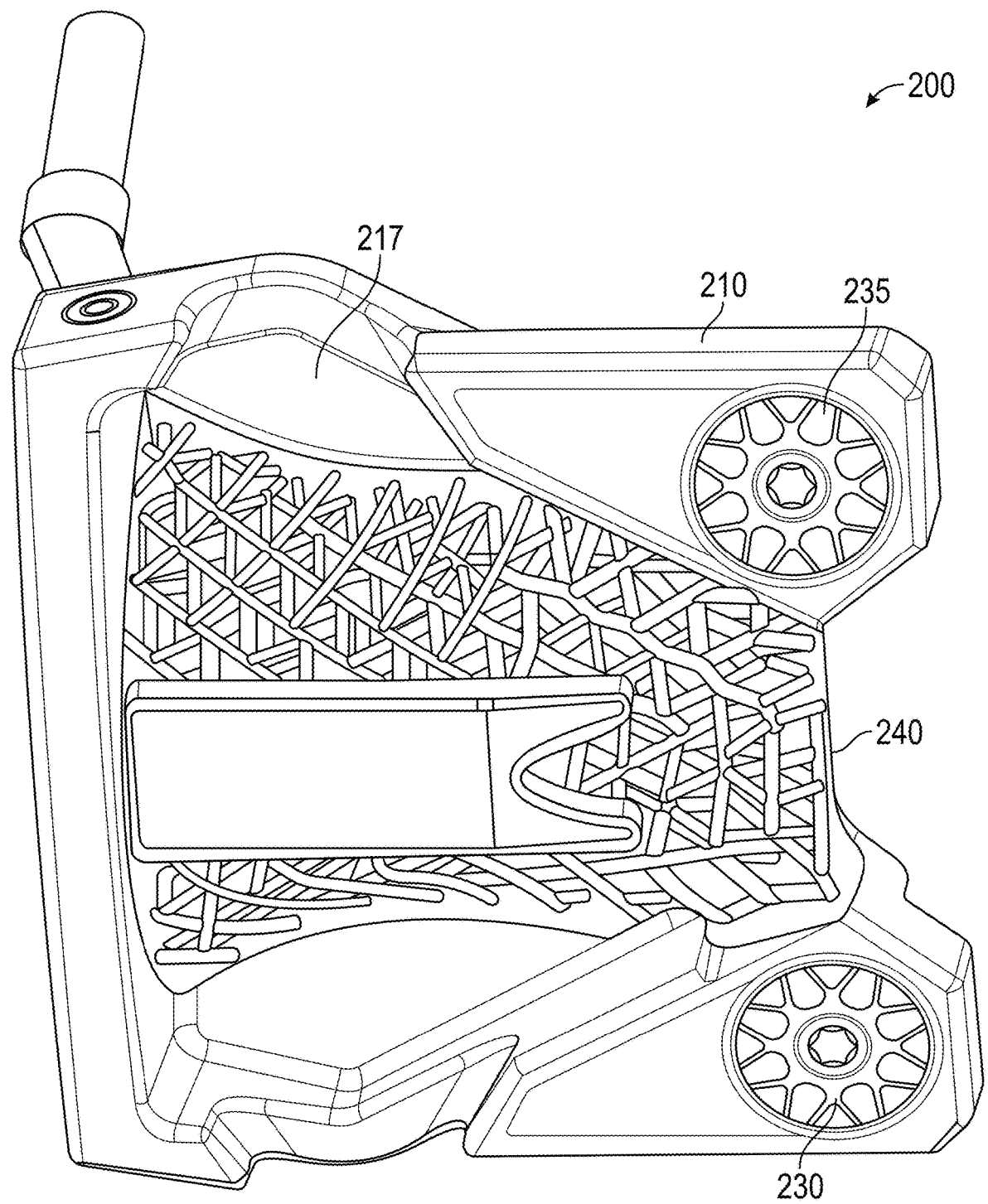
FIG. 44 is a sole perspective view of another embodiment of a putter head with a sole puck formed from a lattice.
Figure 45:
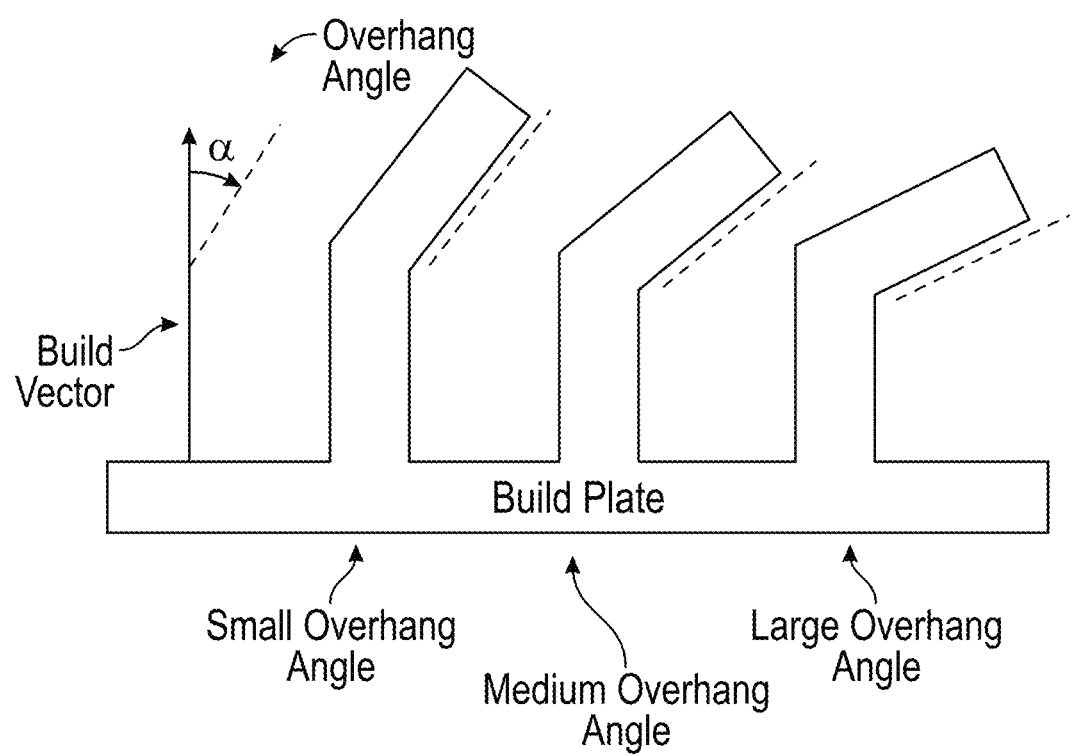
FIG. 45 is a drawing of a build plate with beams having different overhang angles.

Other putter head 200 embodiments are shown in FIGS. 42-44. In these embodiments, the weights 230, 235 are threaded and are disposed at the rear edge 215 of the body, on either side and mostly behind the puck 240. In the embodiments shown in FIGS. 42 and 44, the pucks 240 have different lattice patterns 160 than the one shown in FIGS. 39-41, and do not fill the entirety of the sole recess 217. In the embodiment shown in FIG. 43, the puck 240 has another lattice pattern 160 and fills the entirety of the sole recess 217. In any of these embodiments, the puck 240 may be bonded and/or mechanically fixed to the body 210. The materials, locations, and dimensions may be customized to suit particular players.

In each of these embodiments, the weights 230, 235 preferably are made of a higher density material than the body 210, though in other embodiments, they may have an equivalent density or lower density. Moving weight away from the center improves the mass properties of the putter head 200, increasing MOI and locating the CG at a point on the putter head 200 that reduces twist at impact, reduces offline misses, and improves ball speed robustness on mishits.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A method for manufacturing a component for a golf club head, the method comprising:
    forming a green part by repeatedly spreading layers of a powdered material across a portion of a binder jet machine and depositing a liquid binder on regions of each layer of powder material to bond adjacent particles of powdered material together; and
    sintering the green part to create a final part,
    wherein the final part is a putter head body comprising at least one support member.

2. The method of claim 1, further comprising the step of removing binder via a debinding process, wherein the removing step occurs prior to the sintering step.

3. The method of claim 2, wherein the removing step and the sintering step occur in the same furnace.

4. The method of claim 1, further comprising the step of preparing design parameters for the golf club component using optimization software, wherein the preparing step occurs before all other steps of the method.

5. The method of claim 4, wherein the preparing step comprises inputting into the optimization software at least one parameter, wherein the parameter is selected from the group consisting of individual player measurements, club head delivery data, impact location, and historical player data.

6. The method of claim 1, wherein the at least one support member comprises a first end, a second end, a surface, an equivalent diameter, a spline, and a cross-sectional shape,
    wherein the equivalent diameter $D_E$ of a cross section taken at any point along the spline is calculated using the formula $D_E=(4*A/pi)^{(1/2)}$, wherein A is an area of a cross-section of the support member,
    wherein the at least one support member has a length that is greater than $D_{EA}$, and
    wherein $D_{EA}$ is defined as the average equivalent diameter along the length of the entire support member.

7. The method of claim 6, wherein the equivalent diameter is always greater than 0.010 inch and less than 1.000 inch.

8. The method of claim 6, wherein the spline is curved and has a length that is at least three times the value of the average equivalent diameter $D_{EA}$.

9. The method of claim 6, wherein the equivalent diameter changes continuously along the entire length of the spline.

10. The method of claim 6, wherein the cross-sectional shape changes continuously along the entire length of the spline.

11. The method of claim 1, wherein the at least one support member connects a sole portion of the putter head to a top portion of the putter head.

* * * * *